United States Patent
Burchard et al.

(10) Patent No.: US 10,810,156 B2
(45) Date of Patent: Oct. 20, 2020

(54) GENERAL-PURPOSE PARALLEL COMPUTING ARCHITECTURE

(71) Applicant: Goldman Sachs & Co. LLP, New York, NY (US)

(72) Inventors: Paul Burchard, Jersey City, NJ (US); Ulrich Drepper, New York, NY (US)

(73) Assignee: Goldman Sachs & Co. LLC, New York, NY (US)

(*) Notice: Subject to any disclaimer, the term of this patent is extended or adjusted under 35 U.S.C. 154(b) by 96 days.

(21) Appl. No.: 16/138,590

(22) Filed: Sep. 21, 2018

(65) Prior Publication Data

US 2019/0026248 A1    Jan. 24, 2019

Related U.S. Application Data

(63) Continuation of application No. 15/157,218, filed on May 17, 2016, now Pat. No. 10,108,580.

(60) Provisional application No. 62/165,052, filed on May 21, 2015, provisional application No. 62/173,866, filed on Jun. 10, 2015.

(51) Int. Cl.
  *G06F 15/80*   (2006.01)
  *G06F 9/50*    (2006.01)
  *G06F 15/173*  (2006.01)
  *G06N 3/063*   (2006.01)

(52) U.S. Cl.
  CPC .......... *G06F 15/80* (2013.01); *G06F 9/5072* (2013.01); *G06F 15/17318* (2013.01); *G06F 15/8023* (2013.01); *G06N 3/063* (2013.01)

(58) Field of Classification Search
  None
  See application file for complete search history.

(56) References Cited

U.S. PATENT DOCUMENTS

| | | | |
|---|---|---|---|
| 4,965,717 A | 10/1990 | Cutts, Jr. et al. | |
| 5,493,307 A | 2/1996 | Tsujimoto | |
| 6,389,404 B1 * | 5/2002 | Carson | G06N 3/063 706/18 |
| 6,588,008 B1 | 7/2003 | Heddes et al. | |
| 6,829,697 B1 | 12/2004 | Davis et al. | |
| 6,898,673 B2 * | 5/2005 | Gruner | G06F 12/0813 711/119 |
| 6,986,023 B2 | 1/2006 | Paver et al. | |

(Continued)

FOREIGN PATENT DOCUMENTS

JP    H05-242065 A    9/1993

OTHER PUBLICATIONS

Sharad et al., "Proposal for Neuromorphic Hardware using Spin Devices", Jul. 2012, 7 pages.

(Continued)

*Primary Examiner* — Eric Coleman

(57) ABSTRACT

An apparatus includes multiple parallel computing cores, where each computing core is configured to perform one or more processing operations and generate input data. The apparatus also includes multiple sets of parallel coprocessors, where each computing core is associated with a different one of the sets of parallel coprocessors. The coprocessors in each set of parallel coprocessors are configured to process the input data and generate output data. Each of the computing cores is configured to generate additional input data based on the output data generated by the associated set of parallel coprocessors.

20 Claims, 10 Drawing Sheets

(56) References Cited

U.S. PATENT DOCUMENTS

| | | | |
|---|---|---|---|
| 8,136,071 | B2 | 3/2012 | Solomon |
| 8,374,986 | B2 | 2/2013 | Indeck et al. |
| 8,492,886 | B2 | 7/2013 | Or-Bach et al. |
| 8,623,700 | B1 | 1/2014 | Bernstein et al. |
| 8,949,577 | B2 | 2/2015 | Archer et al. |
| 8,965,834 | B2 | 2/2015 | Burchard |
| 9,063,783 | B2 | 6/2015 | Drepper |
| 10,108,580 | B2 | 10/2018 | Burchard et al. |
| 10,210,134 | B2 | 2/2019 | Burchard et al. |
| 2003/0023831 | A1 | 1/2003 | Deveruex |
| 2004/0039928 | A1* | 2/2004 | Elbe .................. G06F 21/72 713/189 |
| 2006/0179273 | A1 | 8/2006 | Cole et al. |
| 2007/0038843 | A1* | 2/2007 | Trivedi ............ G06F 15/7864 712/34 |
| 2007/0204268 | A1 | 8/2007 | Drepper |
| 2009/0070728 | A1 | 3/2009 | Solomon |
| 2010/0131956 | A1 | 5/2010 | Drepper |
| 2011/0314256 | A1 | 12/2011 | Callahan, II et al. |
| 2012/0066474 | A1 | 3/2012 | Funk |
| 2013/0036426 | A1* | 2/2013 | Igura .................. G06T 1/20 718/108 |
| 2013/0304990 | A1 | 11/2013 | Bass et al. |
| 2014/0095651 | A1* | 4/2014 | Kapil .................. G06F 9/3851 709/216 |
| 2014/0237477 | A1 | 8/2014 | Cadambi et al. |
| 2014/0250287 | A1 | 9/2014 | Akimoto |
| 2014/0289434 | A1 | 9/2014 | Ranganathan et al. |
| 2014/0301395 | A1 | 10/2014 | Khanal et al. |
| 2014/0337850 | A1 | 11/2014 | Iniguez |
| 2015/0012725 | A1 | 1/2015 | Furtek et al. |
| 2015/0074380 | A1* | 3/2015 | Huang .................. G06F 9/3889 712/215 |
| 2017/0220511 | A1 | 8/2017 | Burchard et al. |

OTHER PUBLICATIONS

Wikipedia, "MasPar", Apr. 13, 2016, 4 pages.
Nickolls, "The Design of the MasPar MP-1: A Cost Effective Massively Parallel Computer," 1990, p. 25-28.
Wikipedia, "Transputer," Apr. 28, 2016, 15 pages.
Wikipedia, "Tilera," Apr. 14, 2016, 4 pages.
Wikipedia, "Tile 64," Apr. 8, 2016, 2 pages.
Kabir et al., "On the Design, Development, and Analysis of Optimized Matrix-Vector Multiplication Routines for Coprocessors," Jun. 2015, 16 pages.
Wikipedia, "Connection Machine," Feb. 14, 2016, 4 pages.
Koch et al., "Analog 'Neuronal' Networks in Early Vision", A.I. Memo 751, C.B.I.P. Paper 011, Massachusetts Institute of Technology, Jun. 1985, 18 pages.
ISI Interconnect Systems, Inc., "3D & Advanced Packaging," 2016, 2 pages.
Drepper, "Parallel Programming with Transactional Memory," ACM QUEUE, Sep. 2008, 8 pages.
Wentzlaff et al., "On-Chip Interconnection Architecture of the Tile Processor," IEEE Computer Society, Sep.-Oct. 2007, p. 15-31.
International Search Report and Written Opinion of the International Searching Authority dated Aug. 19, 2016 in connection with International Patent Application No. PCT/US2016/32934, 10 pages.
Monolithic 3D Inc., "The Next Generation 3D-IC Edge," 2011, 7 pages.
Hillis, "The Connection Machine," Massachusetts Institute of Technology, May-Jun. 1985, 157 pages.
Blank, "The MasPar MP-1 Architecture", IEEE 1990, p. 20-24.
IBM Research: Neurosynaptic Chips, "Brain Power," Aug. 2014, 4 pages.
Modha, "Introducing a Brian-inspired Computer TrueNorth's neurons to revolutionize system architecture," Aug. 2014, 6 pages.
Wikipedia, "Neuromorphic engineering," May 3, 2016, 4 pages.
Denning et al., "Highly Parallel Computation", RIACS Technical Report TR-90.35, Aug. 1990, 36 pages.
Shaw et al., "Anton, a Special-Purpose Machine for Molecular Dynamics Simulation," Communications of the ACM, vol. 51, No. 7, Jul. 2008, p. 91-97.
Wikipedia, "Anton (computer)," Apr. 14, 2016, 3 pages.
Seiler et al., "Larrabee: A Many-Core x86 Architecture for Visual Computing", ACM Transactions on Graphics, vol. 27, No. 3, article 18, Aug. 2008, 16 pages.
Supplementary European Search Report dated Dec. 19, 2018 in connection with European Patent Application No. 16797170.4, 10 pages.
International Search Report and Written Opinion of the International Searching Authority dated Jul. 3, 2018 in connection with International Patent Application No. PCT/US2018/026108, 11 pages.
Notice of Reason(s) for Rejection in connection with Japanese Patent Application No. 2017-559643 dated Jun. 23, 2020, 6 pages.

* cited by examiner

GENERAL-PURPOSE PARALLEL COMPUTING ARCHITECTURE

CROSS-REFERENCE TO RELATED APPLICATIONS AND PRIORITY CLAIM

This application claims priority under 35 U.S.C. § 120 as a continuation of U.S. patent application Ser. No. 15/157,218 filed on May 17, 2016, which claims priority under 35 U.S.C. § 119(e) to the following applications:

U.S. Provisional Patent Application No. 62/165,052 filed on May 21, 2015; and

U.S. Provisional Patent Application No. 62/173,866 filed on Jun. 10, 2015. All of these applications are hereby incorporated by reference in their entirety.

TECHNICAL FIELD

This disclosure relates generally to hardware architectures for computing devices and computing systems. More specifically, this disclosure relates to a general-purpose parallel computing architecture, which can support advanced computing functions such as those used in artificial intelligence.

BACKGROUND

The human brain is a massively parallel system typically containing around 100 billion neurons connected by one quadrillion synapses. Ideally, simulating the operation of the human brain could support advanced computing functions such as artificial intelligence. However, conventional attempts at simulating the human brain or designing computing systems that rival the abilities of the human brain have generally been inadequate for a number of reasons, such as not substantially matching the connectivity or three-dimensional structure of the brain.

SUMMARY

This disclosure provides a general-purpose parallel computing architecture.

In a first embodiment, an apparatus includes multiple parallel computing cores, where each computing core is configured to perform one or more processing operations and generate input data. The apparatus also includes multiple sets of parallel coprocessors, where each computing core is associated with a different one of the sets of parallel coprocessors. The coprocessors in each set of parallel coprocessors are configured to process the input data and generate output data. Each of the computing cores is configured to generate additional input data based on the output data generated by the associated set of parallel coprocessors.

In a second embodiment, a system includes multiple integrated circuit devices. Each integrated circuit device includes multiple parallel computing cores, where each computing core is configured to perform one or more processing operations and generate input data. Each integrated circuit device also includes multiple sets of parallel coprocessors, where each computing core is associated with a different one of the sets of parallel coprocessors. The coprocessors in each set of parallel coprocessors are configured to process the input data and generate output data. Each of the computing cores is configured to generate additional input data based on the output data generated by the associated set of parallel coprocessors. The system also includes at least one connection coupling at least some of the communication lines in the integrated circuit devices.

In a third embodiment, a method includes generating input data using multiple parallel computing cores, where each computing core is configured to perform one or more processing operations. The method also includes providing the input data from the computing cores to multiple sets of parallel coprocessors, where each computing core is associated with a different one of the sets of parallel coprocessors. The method further includes processing the input data using the sets of parallel coprocessors to generate output data. In addition, the method includes generating, using each of the parallel computing cores, additional input data based on the output data generated by the associated set of parallel coprocessors.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1A through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, the human brain is a massively parallel system that typically contains around 100 billion neurons connected by one quadrillion synapses. The synapses support the transport of signals between the neurons. The human brain is structured very differently from classical Turing machines. Simulating the human brain using a classical Turing machine is impractical given the large number of neurons and synapses typically in the human brain.

Although there are many components to human intelligence, one key component is dimensional reduction, which refers to the process of receiving a huge amount (high bandwidth) of sensory inputs and reducing the information down to a smaller amount (low bandwidth) of descriptive concepts. Mathematically, this reduction could be achieved using various forms of iterated factor analysis. The various forms of factor analysis tend to have several features in common. For example, in one mode of operation referred to as "forward explanatory mode," the factor analyses perform some simple computation on a large number of inputs, accumulate a sum, and perform a possibly more complex computation on the output. In another mode of operation referred to as "backward learning mode," the factor analyses alter the simple computation on the inputs by some simple computation on the output and corresponding input. Although these computations tend to be simple, the fan-in (referring to the number of inputs) and the fan-out (referring to the number of destinations an output is provided to) can both number in the tens of thousands.

Designing systems that can even somewhat rival the abilities of the human brain have generally been inadequate for a number of reasons. For example, such enormous fan-in and fan-out cannot be practically mapped into a two-dimensional (2D) circuit, which has kept such highly-connected computing architectures out of the mainstream. In order to design computing devices that rival the abilities of the human brain, a hardware architecture with more communication bandwidth is needed. This disclosure describes various new general-purpose "connectionist" hardware architectures that include a number of high-interconnected processing cores. Among other things, these hardware architectures can accelerate a broad class of algorithms in machine learning, scientific computing, video games, and other areas. In some embodiments, these hardware architectures can be manufactured at reasonable cost using modern techniques such as three-dimensional (3D) integrated circuit techniques.

Figure 1A:
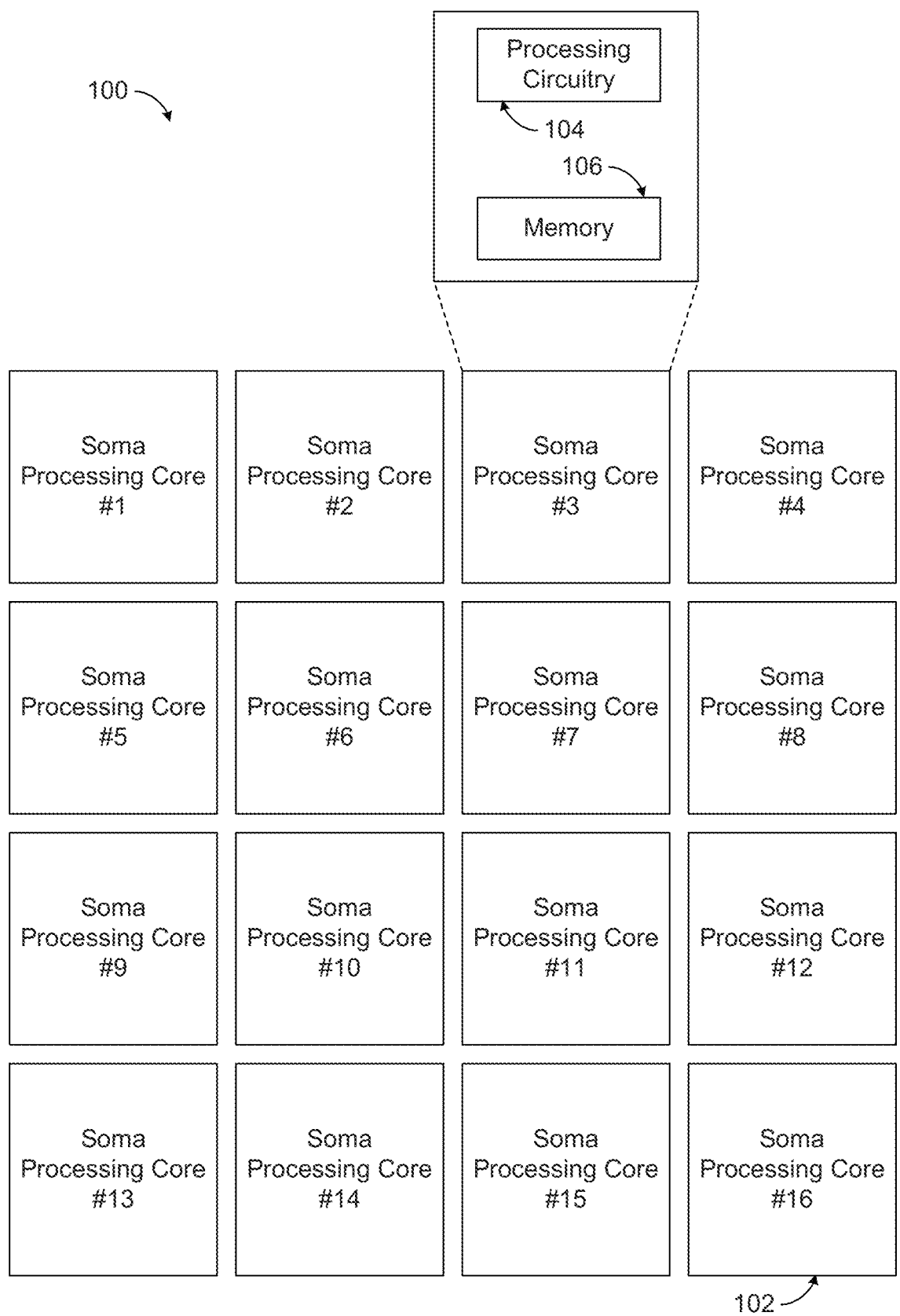
FIGS. 1A through 1C illustrate an example general-purpose parallel computing architecture according to this disclosure.
Figure 1B:
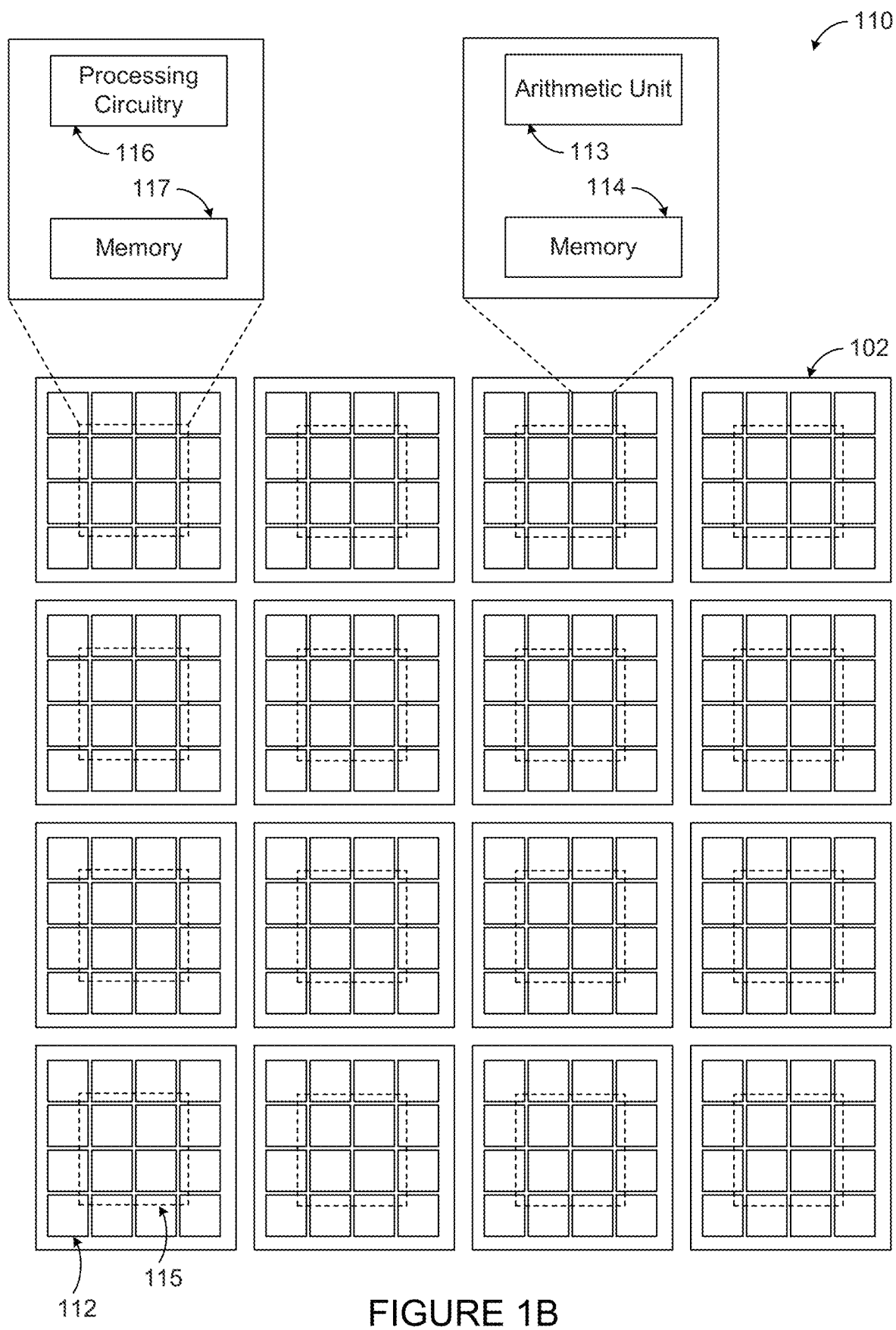
Figure 1C:
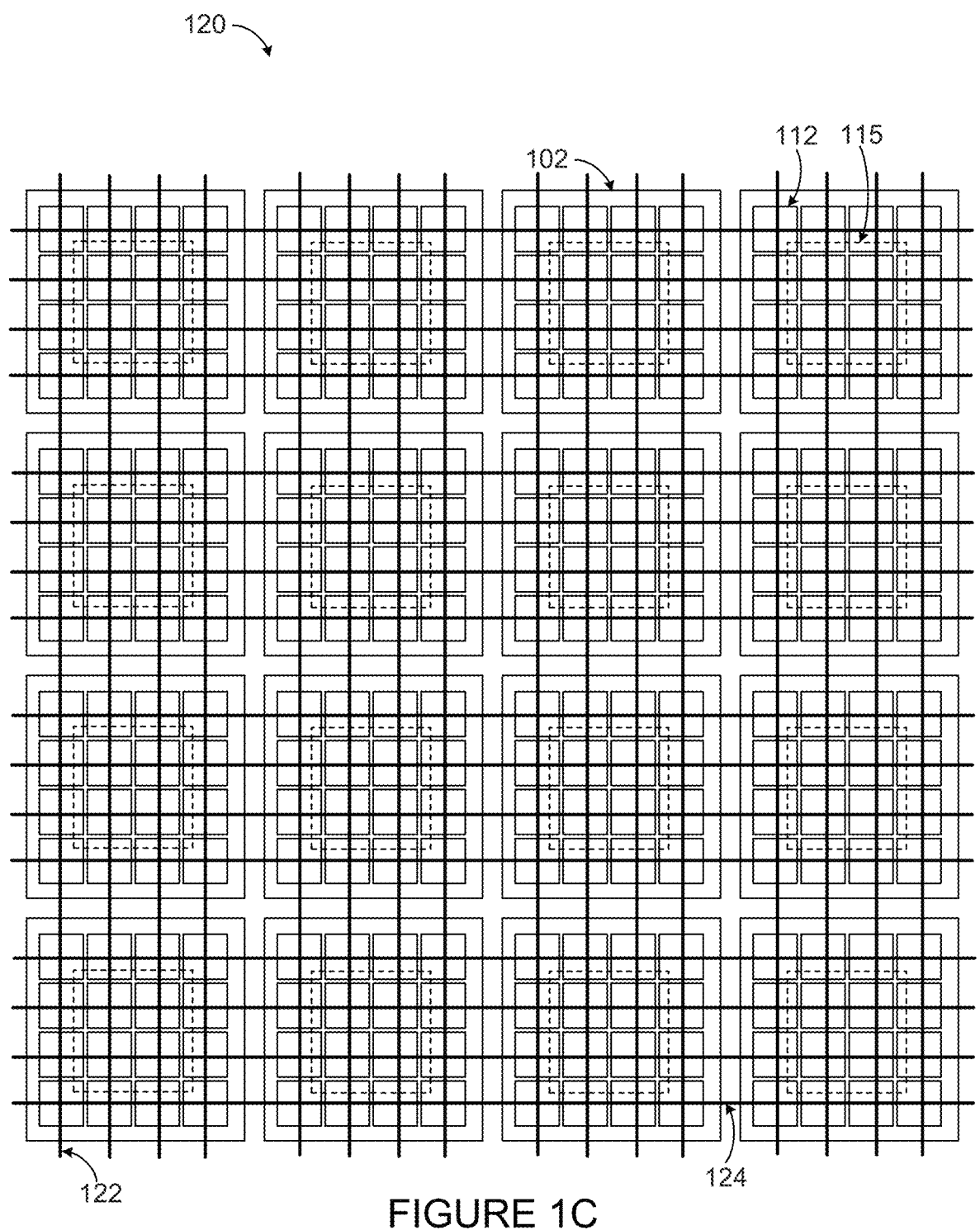

FIGS. 1A through 1C illustrate an example general-purpose parallel computing architecture according to this disclosure. In particular, FIGS. 1A through 1C illustrate an example multi-level structure that provides a hardware architecture with high communication bandwidth. Different levels of the structure perform different functions as described below.

FIG. 1A illustrates a first level 100 of the hardware architecture. This level 100 includes multiple computing or processing cores 102, which are referred to as soma cores. In its minimal form, each soma core 102 can receive one or more data signals, perform some type of processing, and transmit one or more input signals. The structure included in each soma core 102 for performing processing operations can range from a very simple processing core to a very complex processing core. For example, the processing unit in each soma core 102 could be a relatively simplistic computing core, such as general-purpose single instruction, multiple data (SIMD) arithmetic unit. The soma cores 102 could also represent full processing cores, such as those from ARM, INTEL, or other computer processor manufacturers. In some embodiments, the group of soma cores 102 could be implemented using existing "many core" processor designs. However, any suitable computing cores could be used to implement the soma cores 102. While the hardware architecture here includes sixteen soma cores 102, any number of soma cores 102 could be supported in the hardware architecture. In particular embodiments, all of the soma cores 102 here could be implemented within a single integrated circuit chip that is referred to as a processor. Also, it should be noted that the soma cores 102 may or may not be homogenous.

Each soma core 102 includes processing circuitry 104 and at least one memory device 106. The processing circuitry 104 generally denotes circuitry used to perform some type of processing within the soma core 102. As noted above, the processing could be simplistic or complex, and the processing circuitry 104 can vary depending on the specific processing to be performed. The memory device 106 generally denotes any suitable storage and retrieval device(s), such as one or more registers, for storing data used, generated, or received by the soma core 102. In FIG. 1A, while the memory device 106 is shown as being embedded within a soma core 102, each memory device 106 could in whole or in part be located in any other suitable position(s) accessible to a soma core 102.

FIG. 1B illustrates a second level 110 of the hardware architecture, which is associated with the first level 100 of the hardware architecture. The second level 110 includes a number of coprocessors 112 (referred to as synapse coprocessors) associated with each soma core 102. The synapse coprocessors 112 generally process input data transmitted over signal lines (discussed below) between the soma cores 102. Each soma core 102 could be associated with multiple synapse coprocessors 112. As an example, for each soma core 102 in a group of N soma cores, up to N synapse coprocessors 112 could be provided and used to support communications from the soma cores 102 in the group (including itself) to that soma core 102. In some embodiments, each soma core 102 is communicatively coupled to one synapse coprocessor 112 for each of the soma cores 102 in the group. In other words, each soma core 102 can be communicatively coupled to all N soma cores 102. The synapse coprocessors 112 of a "local" or "host" soma core 102 are therefore used to receive and process incoming input data from all soma cores 102 (including itself). This effectively allows all N synapse coprocessors 112 for each soma core 102 to receive input data from all N soma cores 102 in parallel in some embodiments. Note that each soma core 102 may typically include the same number of synapse coprocessors 112, although other embodiments could be used.

Each synapse coprocessor 112 includes any suitable structure supporting the processing of incoming input data for a soma core 102. The synapse coprocessors 112 could have limited capabilities and could be reprogrammable. In some embodiments, each synapse coprocessor 112 includes a programmable or other arithmetic unit 113 and at least one memory device 114. The arithmetic unit 113 denotes any suitable structure configured to execute one or more sequences of instructions to support various functions in the hardware architecture. Examples of these functions include receiving and processing of data in a specific sequence, performing an arithmetic operation on a received input and stored parameters, or forwarding values. The memory device 114 generally denotes any suitable storage and retrieval device(s), such as one or more registers, for storing data used, generated, or received by the synapse coprocessor 112. In FIG. 1B, while the memory device 114 is shown as being embedded within a synapse coprocessor 112, each memory device 114 could in whole or in part be located in any other suitable position(s) accessible to a synapse coprocessor 112.

The second level 110 of the hardware architecture also includes various reducer circuits or "reducers" 115. In some embodiments, there could be one reducer 115 for each soma core 102. Each reducer 115 receives output data that is produced by all of the synapse coprocessors 112 associated with one of the soma cores 102, processes the received output data in some way, and passes the result or results of the processing to the local soma core 102. For example, each reducer 115 could sum or otherwise accumulate received output data values, identify a minimum or maximum received output data value, or perform some other processing operation. In this way, each reducer 115 processes the output data for a soma core 102 and reduces the amount of data provided to that soma core 102.

Each reducer 115 includes any suitable structure for processing multiple output values. In some embodiments, each reducer 115 includes processing circuitry 116 and at least one memory device 117. The processing circuitry 116 generally denotes circuitry used to perform some type of processing within the reducer 115 and is often times much more specialized than the processing circuitry 104 of the soma cores 102. For instance, the processing circuitry 116 could include an adder tree formed by accumulators used to sum all of the output values from the synapse coprocessors 112 associated with one soma core 102. The memory device 117 generally denotes any suitable storage and retrieval device(s), such as one or more registers, for storing data used, generated, or received by the reducer 115. In FIG. 1B, while the memory device 117 is shown as being embedded within a reducer 115, each memory device 117 could in whole or in part be located in any other suitable position(s) accessible to a reducer 115.

FIG. 1C illustrates a third level 120 of the hardware architecture, which is associated with the first and second levels 100 and 110 of the hardware architecture here. The third level 120 includes multiple signal lines 122 and 124 that communicatively couple the soma cores 102, thereby supporting the transport of signals to, from, and between the soma cores 102. In some embodiments, the soma cores 102 are fully connected in that each soma core 102 in a group can communicate directly with all other soma cores 102 in the same group via the signal lines 122 and 124 and appropriate configuration of the synapse coprocessors 112. However, less than full connectivity could also be supported within the hardware architecture.

Note that the physical layout of the signal lines 122 and 124 in FIG. 1C is for illustration only and need not represent the actual physical arrangement of signal lines in the hardware architecture. For example, there are various ways to design a network between the soma cores 102, which may or may not support direct communication between all of the soma cores 102. The signal lines 122 and 124 could therefore be arranged to support any desired communication paths in the hardware architecture.

During operation, each soma core 102 operates to execute desired instructions and process data, possibly including data received from its reducer 115 or other source(s). Each soma core 102 can provide the results of its processing operations to other soma cores 102 (and possibly itself) as input data, and each soma core 102 could receive the input data generated by other soma cores' processing operations via its synapse coprocessors 112. The synapse coprocessors 112 for each soma core 102 can perform desired processing operations on the input data, and data output by the synapse coprocessors 112 can be further processed by the reducer 115 for each soma core 102. Results from the reducers 115 are provided to the local/host soma cores 102, which can use the data to perform additional processing operations.

It is also possible to support multiple "channels" in each communication from a soma core 102 to the connected synapse processors 112, where each channel can be associated with different processing operations. For example, each synapse coprocessor 112 could receive input data over multiple channels from one soma core 102, and the synapse coprocessors 112 connected to that soma core 112 could perform different processing operations depending on the channels used for the input data. Moreover, each reducer 115 could receive output data from its associated synapse coprocessors 112 over multiple channels, and the reducer 115 could perform different processing operations depending on the channel the output data was received from by the synapse processor 112. The channels could denote actual physical channels (such as when data is sent over different signal lines) or logical channels (such as when data is sent over a common signal line with different channel identifiers). In these embodiments, different registers or other memory locations in the soma cores 102, synapse coprocessors 112, and reducers 115 could be used to store different data and different programming instructions. This allows the hardware architecture to support concurrency or other types of programming operations.

As noted above, the memory device 114 of each synapse coprocessor 112 can include a number of registers. In some embodiments, the registers can include registers associated with each possible connection partner (each soma core 102) and used to hold incoming input data for each connection partner's channel(s). The registers could also include local registers used to hold parameter values and other values used during execution of programming instructions. In particular embodiments, processing operations of the synapse coprocessors 112 are described using one or more instructions executed in response to incoming input data, and there are no command loops in the synapse coprocessors 112.

Each soma core 102 could individually control the installation of program instructions on its synapse coprocessors 112, and different program instructions can be provided for different channels. For example, there might be an instruction causing a soma core 102 to load the same program to some or all of its synapse coprocessors 112. There might also be instructions causing the soma core 102 to load parameter registers of its synapse coprocessors 112, often with different values. Note that a soma core 102 could load all of this data from a given memory area that is large enough to hold values for all registers of all of the soma core's synapse coprocessors 112. Each soma core 102 could be allowed to read the individual parameter registers of its synapse coprocessors 112 but not the values of the per-channel registers. Instead, the values in the per-channel registers can be processed by the synapse processors 112 and/or be fed into the associated reducer 115, which can be programmed by the local/host soma core 102 to operate on the data received for each channel appropriately. The inputs to each reducer 115 can represent the output values from all synapse coprocessors 112 for the associated soma core 102 on a specific channel.

Each soma core 102 could support a number of new instructions to facilitate the use of the synapse coprocessors 112 and the reducers 115 as described above. For example, each soma core 102 could support instructions for sending an input data element to (a specific channel of) all soma cores 102, for sending input data to a specific channel of its own synapse coprocessors 112, for receiving results from its own reducer 115, for installing or selecting programs or other instructions in its synapse coprocessors 112 and reducer 115, and for storing data in the parameter registers of the synapse coprocessors 112. Additional details of example instructions supported in the hardware architecture are provided below.

In some embodiments, the hardware architecture shown in FIGS. 1A through 1C could be implemented within a single integrated circuit chip. The integrated circuit chip could be fabricated in any suitable manner, such as by using long-standing fabrication techniques such as Silicon-on-Insulator (SOI) or more recently developed techniques such as three-dimensional integrated circuit fabrication techniques. If needed or desired, multiple instances of the hardware architecture shown in FIGS. 1A through 1C could be coupled together and used in order to expand the number of soma cores 102 available for use. For example, multiple integrated circuit chips could be communicatively coupled together to provide any desired number of soma cores 102, such as by coupling the signal lines 122 and 124 of each instance of the hardware architecture using one or more high-speed connections.

Also, in some embodiments, each soma core 102 could be configured to perform a specific function or a combination of functions in order to provide desired functionality in the hardware architecture. In other embodiments, each soma core 102 could be programmable so that the function(s) of the soma cores 102 can be defined and can change over time or as desired. Similarly, in some embodiments, each synapse coprocessor 112 and reducer 115 could be configured to perform a specific function or a combination of functions in order to provide desired functionality in the hardware architecture. In other embodiments, each synapse coprocessor 112 and reducer 115 could be programmable so that the function(s) of the synapse coprocessors 112 and reducer 115 can be defined and can change over time or as desired.

Note that the processing performed by the soma cores 102 can occur in parallel and that the processing performed by the synapse coprocessors 112 and the reducers 115 for each soma core 102 can also occur in parallel. In this way, each soma core 102 is able to communicate via multiple signal lines 122 and 124 at the same time given sufficient communication infrastructure between the soma cores 102. Given an adequate number of soma cores 102, synapse coprocessors 112, reducers 115, and signal lines 122 and 124, this hardware architecture can support a massive number of communication connections between computing cores, and those communication connections can all be available for use at the same time. As a result, this design represents a hardware architecture with more communication bandwidth.

Although FIGS. 1A through 1C illustrate one example of a general-purpose parallel computing architecture, various changes may be made to the hardware architecture shown in FIGS. 1A through 1C. For example, a hardware architecture could support any suitable number of soma cores, along with a suitable number of synapse coprocessors and reducers. Also, each soma core, synapse coprocessor, and reducer could be implemented in any other suitable manner, such as by using shared computing resources for the soma cores or synapse coprocessors or by using multiple reducers that allow performing more than one operation concurrently. In addition, various components in FIGS. 1A through 1C could be combined, further subdivided, rearranged, or omitted and additional components could be added according to particular needs. As particular examples, one or more soma cores 102 may not need to be used in conjunction with a reducer 115.

Figure 2:
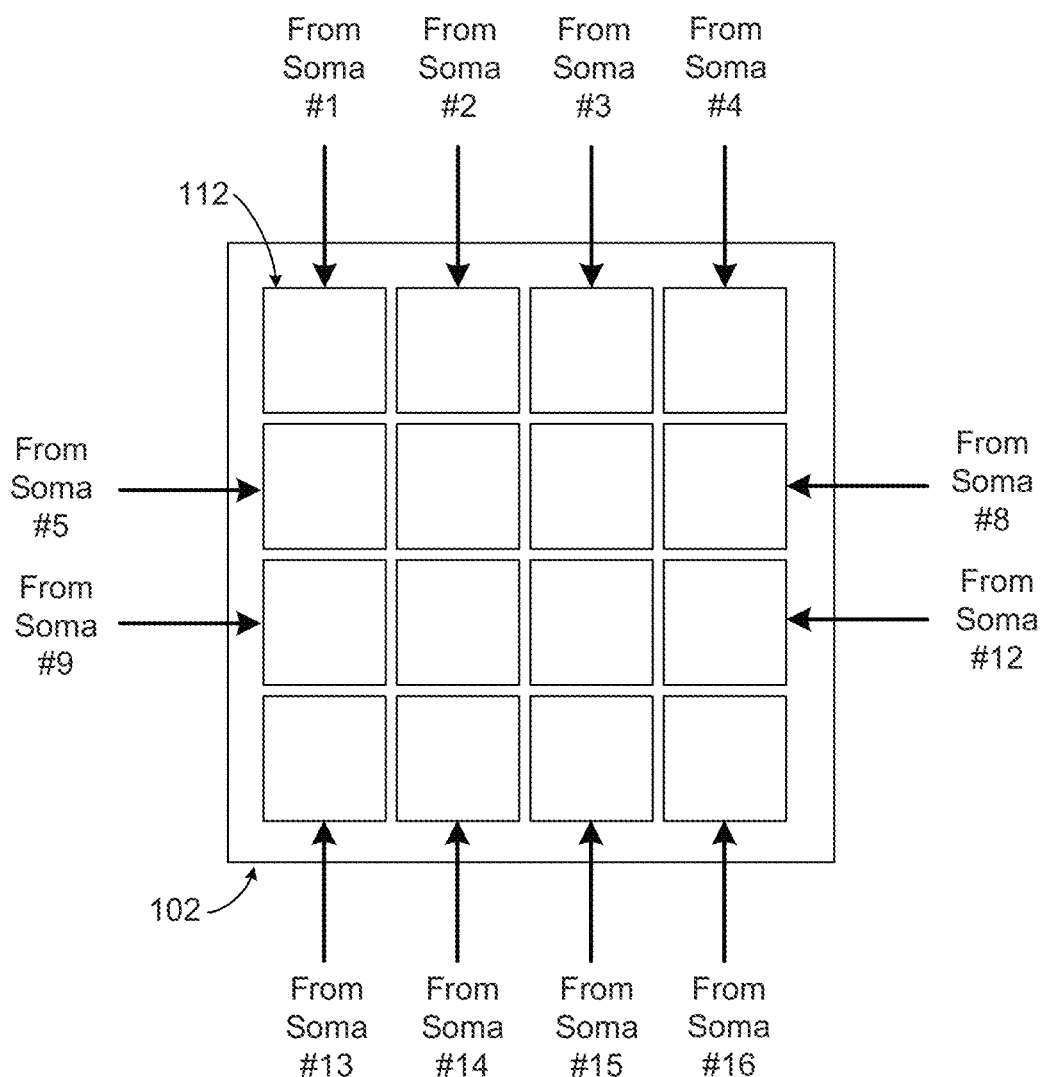
FIGS. 2 and 3 illustrate example communications in the computing architecture of FIGS. 1A through 1C according to this disclosure.
Figure 3:
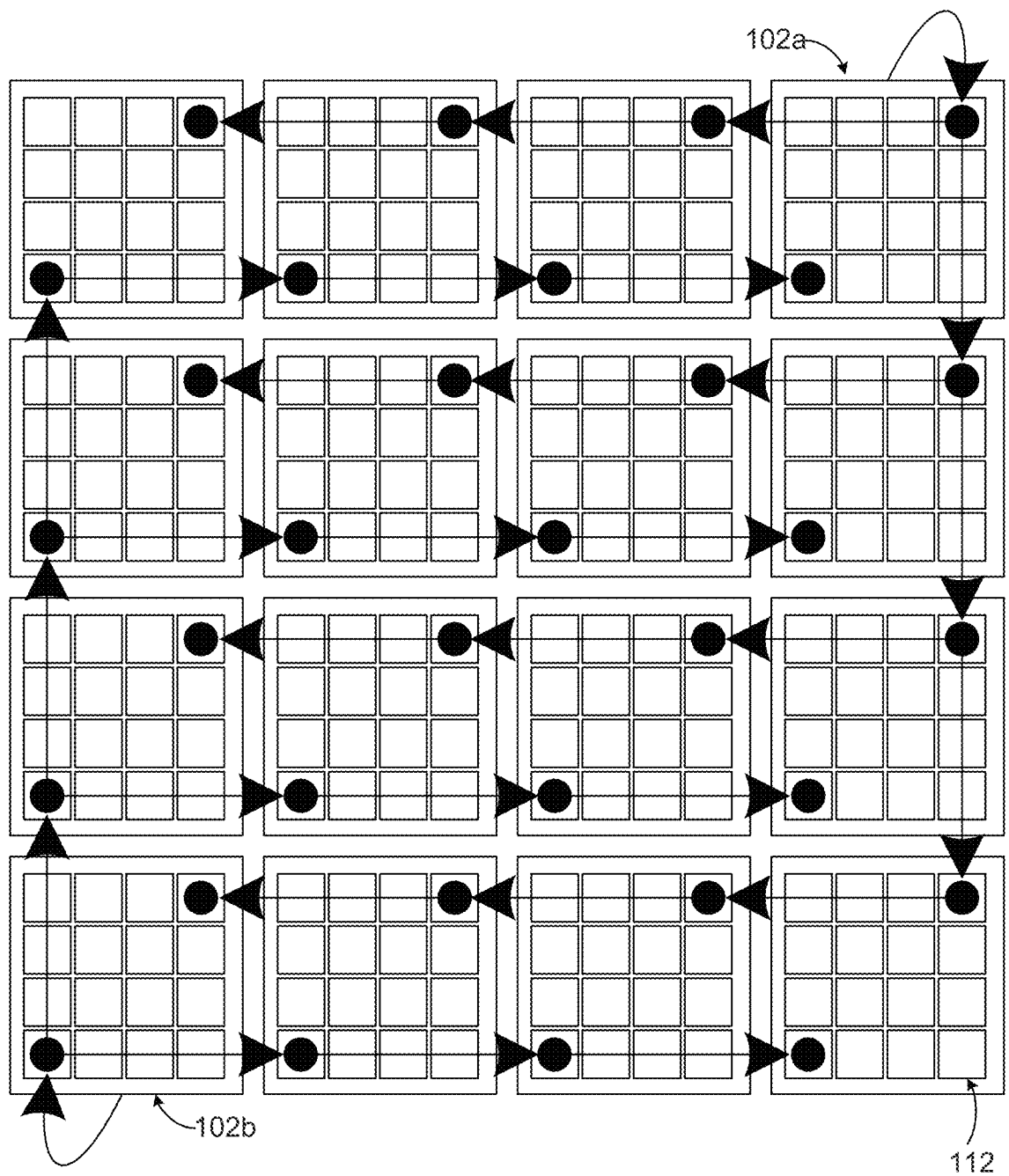

FIGS. 2 and 3 illustrate example communications in the computing architecture of FIGS. 1A through 1C according to this disclosure. As shown in FIG. 2, each soma core 102 can have synapse coprocessors 112 that receive input data from all soma cores 102 (including itself). This same pattern can be repeated for all soma cores 102 in a group of soma cores 102. The signal lines 122 and 124 described above can be used to couple each soma core 102 to one synapse coprocessor 112 of all soma cores 102 in a suitable manner to support these communications.

When there are N soma cores 102, each soma core 102 could be provided with N synapse coprocessors 112 (one synapse coprocessor 112 per soma core 102 including itself). Each soma core 102 can broadcast information to all soma cores 102, and each soma core 102 can receive information from all other soma cores 102 via its synapse coprocessors 112. Effectively, in some embodiments, the N synapse coprocessors 112 for each of the N soma cores 102 can support N independent communication networks between the soma cores 102.

FIG. 3 illustrates one specific example of two of the independent communication networks between soma cores. As shown in FIG. 3, one soma core 102a can broadcast input data to one synapse coprocessor 112 of each soma core 102 in the system. Similarly, another soma core 102b can broadcast data to one synapse coprocessors 112 of each soma core 102 in the system. The broadcasting by the soma cores 102a and 102b can, in some embodiments, occur simultaneously. As a result, N soma cores 102 can engage in N broadcasts of data simultaneously.

Note that while the broadcasting here is shown as occurring serially from one soma core to the next in rows and columns, this is for ease of illustration only. Each synapse coprocessor 112 that is broadcasting data could alternatively broadcast the data directly to synapse coprocessors 112 of all soma cores 102 via the signal lines 122 and 124. Of course, if needed or desired, it is also possible to allow multiple soma cores 102 to broadcast over the same signal lines 122 and 124, such as with some sort of addressing or contention mechanism in place.

Although FIGS. 2 and 3 illustrate examples of communications in the computing architecture of FIGS. 1A through 1C, various changes may be made to FIGS. 2 and 3. For example, a hardware architecture could support any suitable number of soma cores, along with a suitable number of synapse coprocessors. Also, various components in FIGS. 2 and 3 could be combined, further subdivided, rearranged, or omitted and additional components could be added according to particular needs. In addition, any suitable communications amongst the soma cores 102 could be supported.

Figure 4:
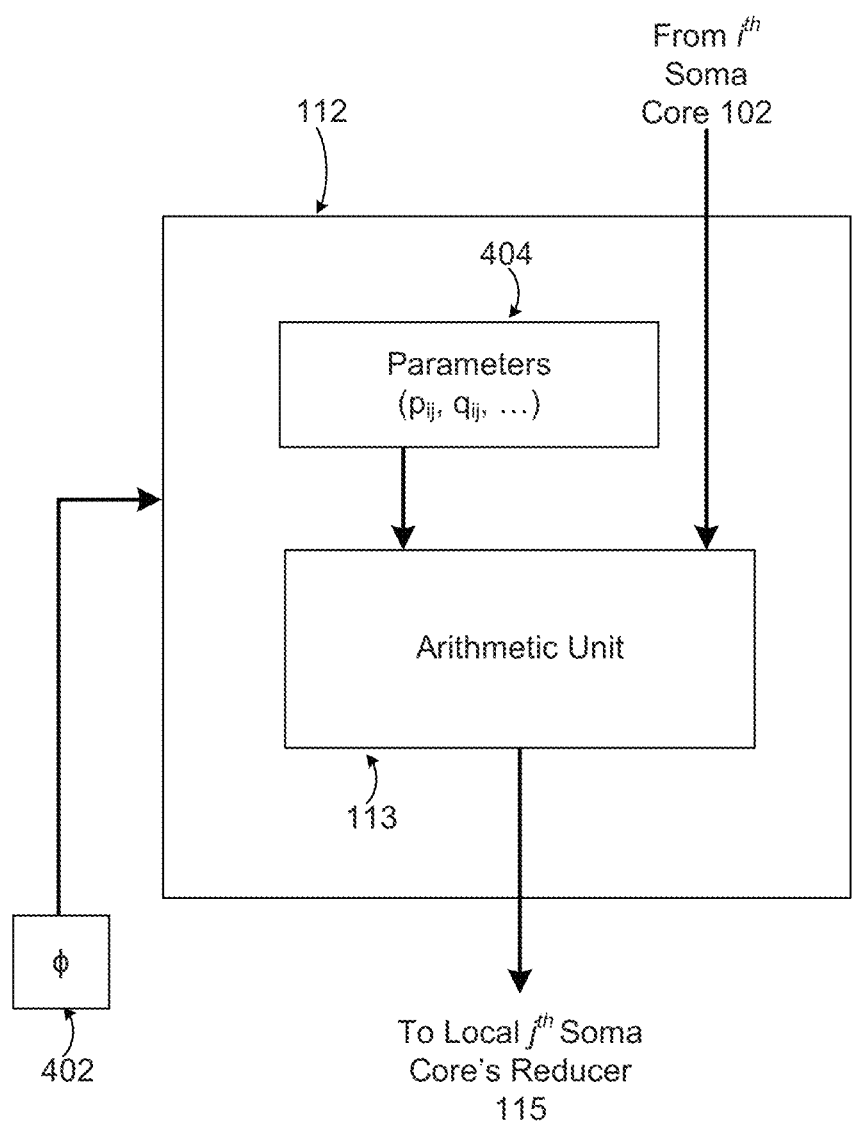
FIGS. 4 and 5 illustrate example coprocessor functionality in the computing architecture of FIGS. 1A through 1C according to this disclosure.
Figure 5:
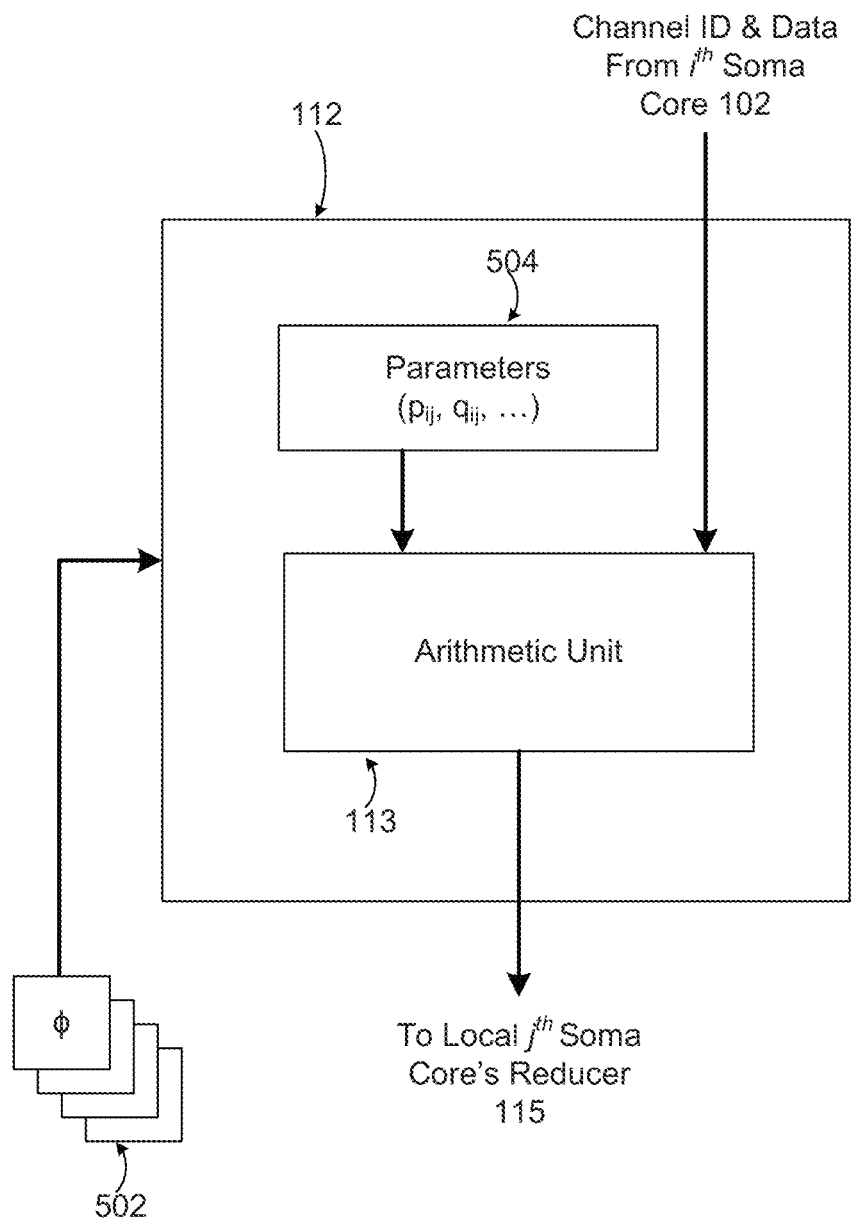

FIGS. 4 and 5 illustrate example coprocessor functionality in the computing architecture of FIGS. 1A through 1C according to this disclosure. In particular, FIGS. 4 and 5 illustrate example mechanisms for implementing the synapse coprocessors 112 described above. Note that these example implementations are for illustration only and that the synapse coprocessors 112 could be implemented in other ways.

As shown in FIG. 4, a synapse coprocessor 112 for the $j^{th}$ soma core 102 can be implemented using the arithmetic unit 113 described above. The arithmetic unit 113 performs one or more desired computations using incoming input data received from the $i^{th}$ soma core 102. The arithmetic unit 113 then outputs the resulting output data to a reducer 115 associated with the $j^{th}$ soma core 102. The reducer 115 can process the outputs from multiple arithmetic units 113 of multiple synapse coprocessors 112 associated with the $j^{th}$ soma core 102 and provide the result(s) to the $j^{th}$ soma core 102.

The operation(s) performed by the arithmetic unit 113 in FIG. 4 could be defined or controlled using a program (ϕ) 402, and the program 402 operates using one or more parameters 404. The program 402 and the parameter(s) 404 can be stored within the memory device 114 or other location(s). The one or more parameters 404 can be set or controlled by the synapse coprocessor 112, by the associated soma core 102, or in any other suitable manner. Example operations that could be performed by the arithmetic unit 113 can include adding, subtracting, or multiplying values; generating a constant value across all synapse coprocessors 112 associated with a soma core 102; outputting an identifier for the synapse coprocessor 112; selecting one of multiple values based on a test value; or calculating the sign or inverse square root of a value.

As shown in FIG. 5, there can be multiple operations or sets of operations performed within the hardware architecture. A "channel identifier" value can be used by the synapse coprocessor 112 to identify which of multiple selectable programs ($\phi$) 502 are to be executed by the arithmetic unit 113 on incoming data. The "channel identifier" can also be used to control which parameter(s) 504 are used by the arithmetic unit 113 and where results generated by the arithmetic unit 113 are sent. The selectable programs 502 and the parameters 504 could be stored in the memory device 114 of the synapse coprocessor 112 or in other location(s).

In some embodiments, each of the arithmetic units 113 and the reducers 115 could be implemented in a pipelined fashion, and incoming data could denote scalar values or small vectors of values. In these embodiments, multiple scalar values or at least one vector of values could be received from the $i^{th}$ soma core 102, and a single program 502 or different programs 502 could be applied to the values by the arithmetic unit 113 to produce a sequence of output values. The sequence of output values could be provided to the reducer 115 for further processing.

Although FIGS. 4 and 5 illustrate examples of coprocessor functionality in the computing architecture of FIGS. 1A through 1C, various changes may be made to FIGS. 4 and 5. For example, each synapse coprocessor 112 could be implemented in any other defined or reconfigurable manner.

Figure 6:
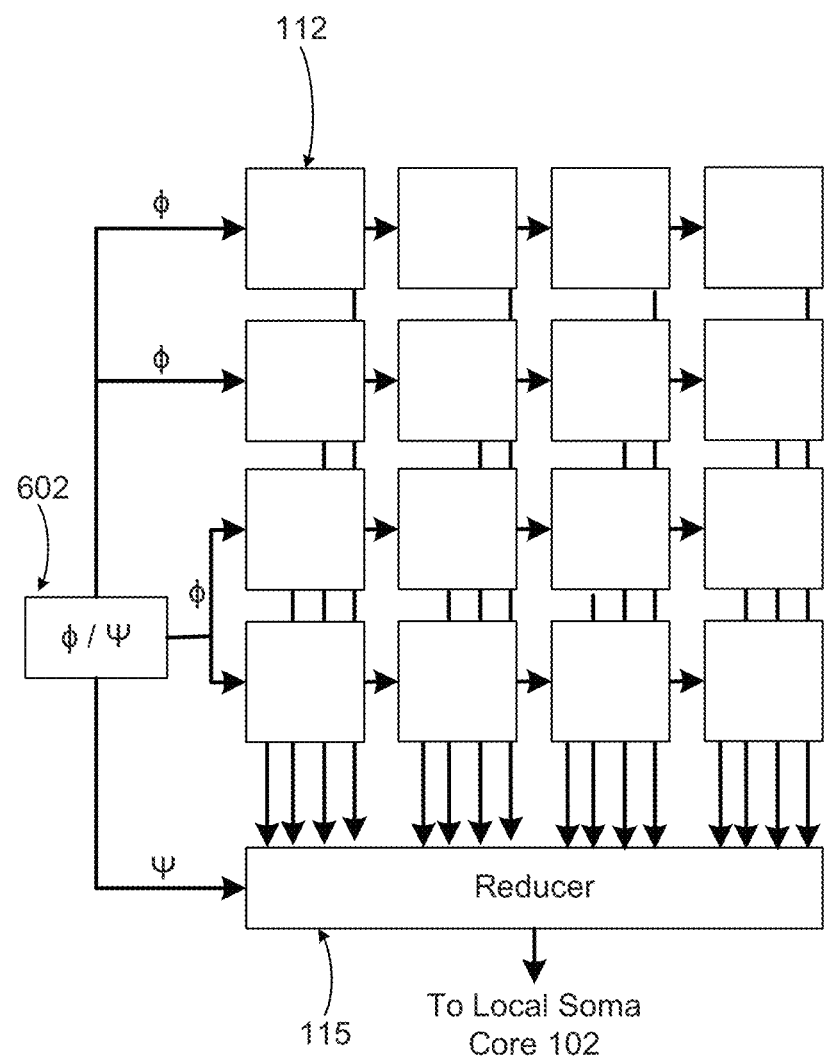
FIG. 6 illustrates an example programmable coprocessor and reduction functionality in the computing architecture of FIGS. 1A through 1C according to this disclosure.

FIG. 6 illustrates an example programmable coprocessor and reduction functionality in the computing architecture of FIGS. 1A through 1C according to this disclosure. In particular, FIG. 6 illustrates an example mechanism for controlling the programming of the synapse coprocessors 112 and the reducers 115 described above.

As shown in FIG. 6, a reducer 115 is configured to receive the output data from multiple synapse coprocessors 112 associated with a soma core 102. The reducer 115 then performs at least one operation (identified by $\Psi$) using the outputs from the synapse coprocessors 112 to generate at least one result that is provided to the associated soma core 102. The one or more computations performed by the reducer 115 could include any suitable operations performed using the outputs from multiple synapse coprocessors 112. In some embodiments, the reducer 115 could execute one or more sequences of instructions to support various functions in the hardware architecture. For example, after receiving data from the coprocessors 112 of the associated soma core 102 in parallel, the reducer 115 could perform a programmable operation on the received data and output the result(s) to the associated soma core 102. Example operations can include summing or multiplying the outputs from all synapse coprocessors 112, identifying a minimum or maximum output from the synapse coprocessors 112, or selecting a specific synapse coprocessor's value as the output.

A memory device 602 can be used in this structure to store one or more programs ($\phi$) executed by the synapse coprocessors 112. The memory device 602 can also be used to store one or more programs ($\Psi$) executed by the reducer 115. The memory device 602 represents any suitable volatile or non-volatile storage and retrieval device or devices, such as part of one or more of the memories 106, 114, 117.

Although FIG. 6 illustrates one example of programmable coprocessor and reduction functionality in the computing architecture of FIGS. 1A through 1C, various changes may be made to FIG. 6. For example, a hardware architecture could support any suitable number of soma cores, along with a suitable number of synapse coprocessors and reducers. Also, various components in FIG. 6 could be combined, further subdivided, rearranged, or omitted and additional components could be added according to particular needs.

Figure 7:
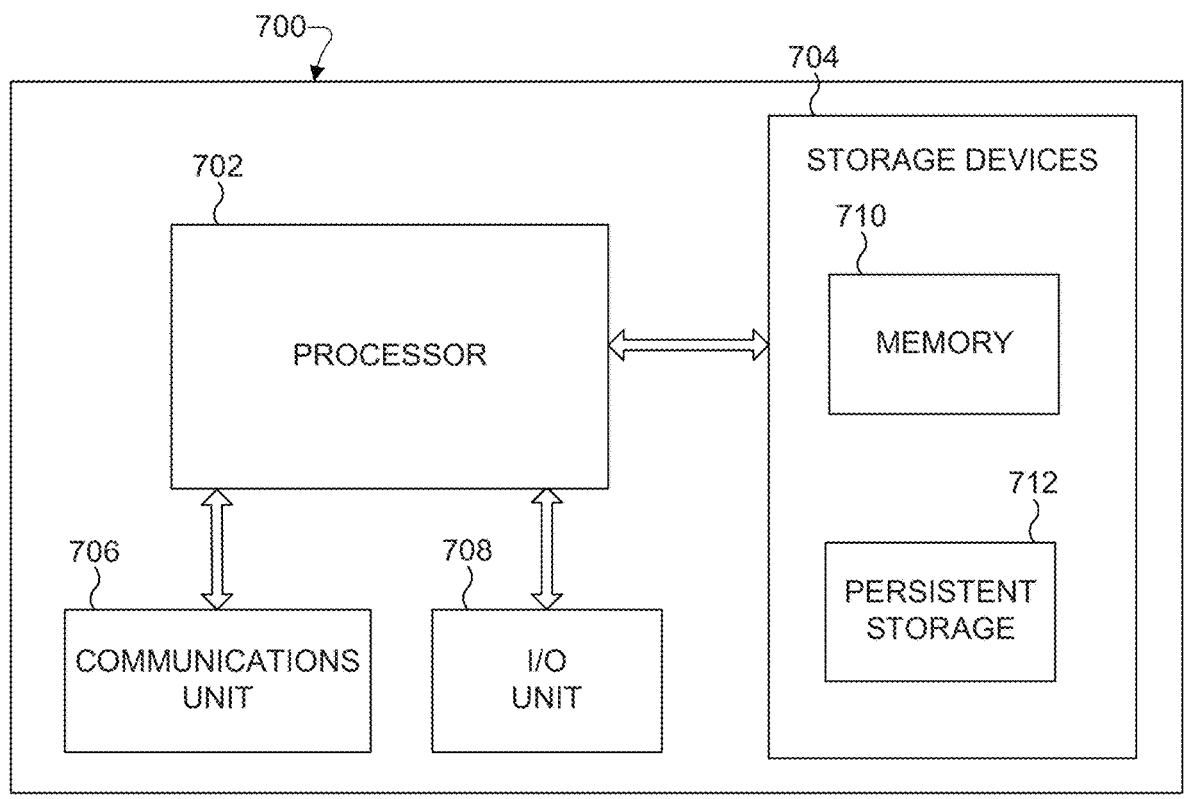
FIGS. 7 and 8 illustrate example computing systems using a general-purpose parallel computing architecture according to this disclosure.
Figure 8:
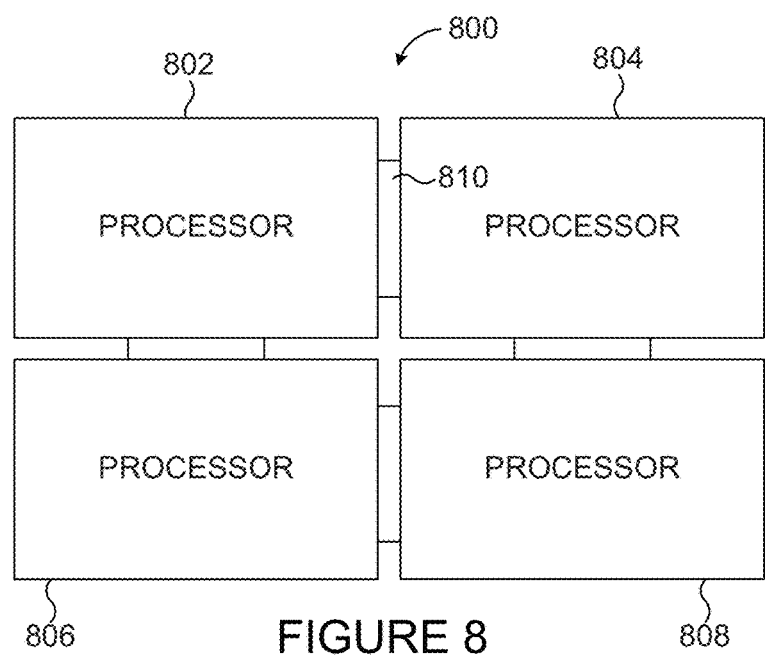

FIGS. 7 and 8 illustrate example computing systems using a general-purpose parallel computing architecture according to this disclosure. As shown in FIG. 7, a computing system 700 includes at least one processor 702, at least one storage device 704, at least one communications unit 706, and at least one input/output (I/O) unit 708.

The processor 702 could denote an integrated circuit chip incorporating the soma cores 102, synapse coprocessors 112, reducers 115, and signal lines 122 and 124 described above. The processor 702 executes instructions, such as those that may be loaded into a memory device 710 and then loaded into the registers or other memories of the soma cores 102, synapse coprocessors 112, and reducers 115. The processor 702 may include any suitable numbers of soma cores 102, synapse coprocessors 112, reducers 115, and signal lines 122 and 124.

The memory device 710 and a persistent storage 712 are examples of storage devices 704, which represent any structure(s) capable of storing and facilitating retrieval of information (such as data, program code, and/or other suitable information on a temporary or permanent basis). The memory device 710 may represent a random access memory or any other suitable volatile or non-volatile storage device(s). The persistent storage 712 may contain one or more components or devices supporting longer-term storage of data, such as a read only memory, hard drive, Flash memory, or optical disc.

The communications unit 706 supports communications with other systems or devices. For example, the communications unit 706 could include a network interface card or a wireless transceiver facilitating communications over a wired or wireless network. The communications unit 706 may support communications through any suitable physical or wireless communication link(s).

The I/O unit 708 allows for input and output of data. For example, the I/O unit 708 may provide a connection for user input through a keyboard, mouse, keypad, touchscreen, or other suitable input device. The I/O unit 708 may also send output to a display, printer, or other suitable output device.

If needed or desired, multiple instances of the hardware architecture shown in FIGS. 1A through 1C could be coupled together and used in order to expand the number of soma cores 102 available for use. For example, multiple integrated circuit chips could be communicatively coupled together to provide any desired number of soma cores 102. An example of this is shown in FIG. 8, where a multi-processor arrangement 800 could be used in the computing system 700 as the processor 702 or in another computing system. The multi-processor arrangement 800 here includes at least two processors coupled by at least one high-speed connection. In this example, four processors 802-808 are coupled by four high-speed connections 810 in a ring, although any other suitable numbers and arrangements of processors and high-speed connections could be used.

Each high-speed connection 810 can support any suitable communication path(s) for coupling multiple instances of the hardware architecture shown in FIGS. 1A through 1C. For example, each high-speed connection 810 can be communicatively coupled to the third level 120 of each instance of the hardware architecture so that the high-speed connection 810 supports the transport of signals between the signal lines 122 and/or 124 of the hardware instances. Each high-speed connection 810 includes any suitable structure for transporting signals between hardware instances, such as between multiple integrated circuit chips.

Various types of high-speed connections 810 could be used to support a multi-processor architecture. For example, each high-speed connection 810 could be implemented using a photonic connection between two integrated circuit chips. As another example, the integrated circuit chips themselves could support "quilt" packaging, where each integrated circuit chip includes electrical connections along at least one side and the integrated circuit chips are mounted so that electrical connections on different chips contact one another. Note, however, that any other or additional high-speed connections 810 could also be used.

Although FIGS. 7 and 8 illustrate examples of computing systems using a general-purpose parallel computing architecture, various changes may be made to FIGS. 7 and 8. For example, the hardware architecture shown in FIGS. 1A through 1C could be used in any other suitable system to perform any suitable functions.

Figure 9:
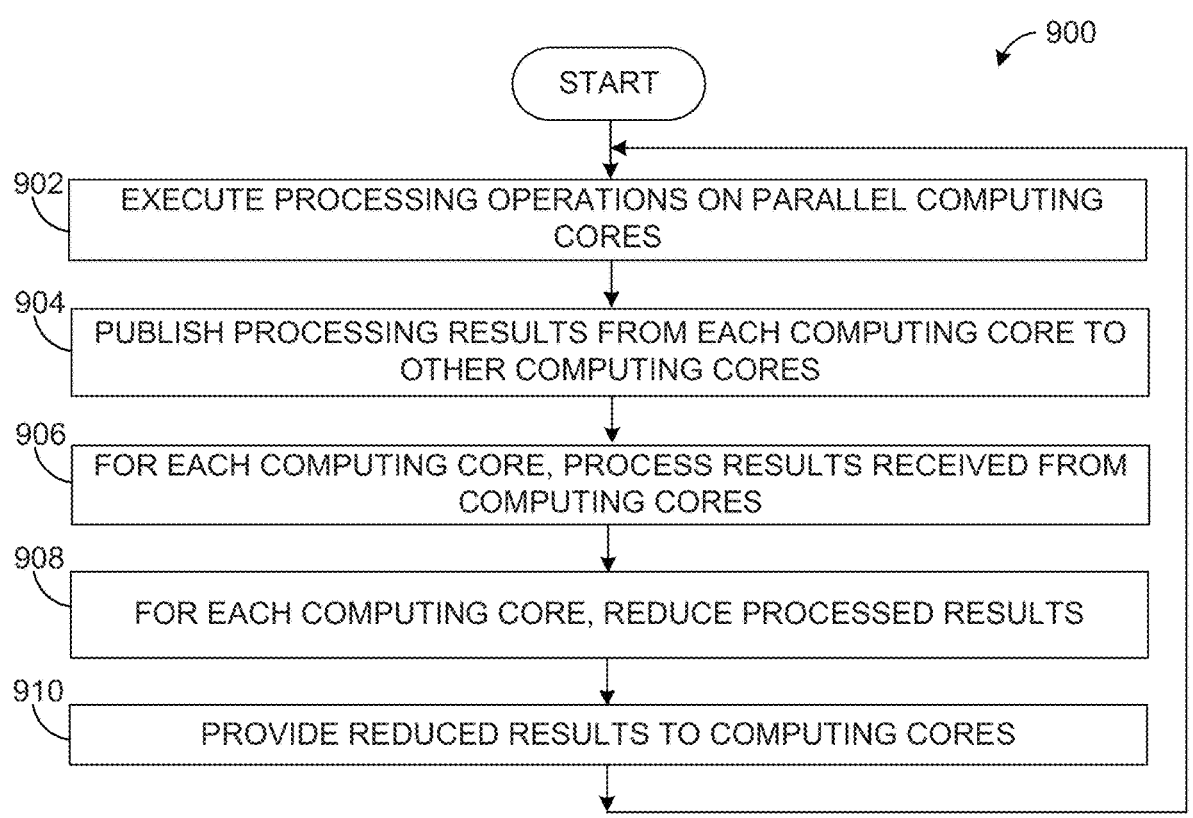
FIG. 9 illustrates an example method for supporting advanced computing functions using a general-purpose parallel computing architecture according to this disclosure.

FIG. 9 illustrates an example method 900 for supporting advanced computing functions using a general-purpose parallel computing architecture according to this disclosure. For ease of explanation, the method 900 is described with respect to the hardware architecture shown in FIGS. 1A through 1C. However, the method 900 could be used with any other suitable hardware architecture.

As shown in FIG. 9, processing operations are executed using multiple parallel computing cores at step 902. This could include, for example, the soma cores 102 in one or more processors executing instructions to perform any of a wide variety of computations. The processing operations could denote simplistic operations performed by SIMD soma cores 102 up to complex operations performed by full-processor soma cores 102. Note that the operations shown in FIG. 9 can be executed in order because of dependencies of the operations. Multiple independent chains of the same operations can be performed concurrently and communication and synapse/reducer operations can be performed in parallel using channel addressing as described above.

The processing results from each computing core are published to other computing cores at step 904. This could include, for example, each soma core 102 providing its processing results over the signal lines 122 and 124 to one synapse coprocessor 112 of each soma core 102. In some embodiments, this results in the synapse coprocessors 112 for each soma core 102 receiving the processing results from all of the soma cores 102.

For each computing core, the processing results from the computing cores are processed at step 906 and reduced at step 908. This could include, for example, the synapse coprocessors 112 associated with each soma core 102 performing some type of processing on the processing results from all of the soma cores 102. Specific examples of the types of operations that could be performed by the arithmetic unit 113 of the synapse coprocessors 112 are described below. This could also include the reducer 115 for each soma core 102 processing the outputs of the synapse coprocessors 112 for that soma core 102. Specific examples of the types of operations that could be performed by the reducer 115 are described below. Note that the operations performed by the synapse coprocessors 112 and the reducers 115 could be controlled and can vary, such as when different programs (I) and 4' are used for different channels of data.

The reduced results are provided to the computing cores at step 910. This could include, for example, the reducers 115 providing outputs to their associated soma cores 102. At this point, the method 900 could be repeated, with the computing cores using the reduced results during further execution of the processing operations. Alternatively, the method 900 could end and be repeated later with new data.

Although FIG. 9 illustrates one example of a method 900 for supporting advanced computing functions using a general-purpose parallel computing architecture, various changes may be made to FIG. 9. For example, while shown as a series of steps, various steps in FIG. 9 could overlap, occur in parallel, occur in a different order, or occur any number of times.

In some of the embodiments described above, each soma core 102 can program its synapse coprocessors 112 to execute at least one program $\phi$, and the program(s) $\phi$ can be executed as soon as incoming data arrives. The reducer 115 for a soma core 102 executes at least one program $\Psi$ using the results of program $\phi$ from all of the synapse coprocessors 112 for that soma core 102. In particular embodiments, each program $\phi$ can often execute in O(1) time given a fixed vector size and no loops, and the program $\Psi$ can often execute in O(log N) time. Also, in particular embodiments, the collective processing performed by the synapse coprocessors 112 and the reducer 115 for each soma core 102 could be expressed as:

$$y_j = (\Psi_j)_{i=1}^{N} \phi_j(x_i, p_{ij}) \tag{1}$$

Here, i denotes the identity of a sender soma core 102 (or the identity of a soma core 102 plus a soma group identifier of the soma core 102), and N denotes the number of soma cores 102 (or the number of soma cores 102 times the number of soma groups). Also, j denotes a channel identifier, and p denotes one or more parameters (such as parameters 402 or 502) used in the synapse coprocessors 112 (such as state or local variables, which may or may not be channel-specific). Further, $x_i$ denotes the output of the $i^{th}$ soma core 102, and $y_j$ denotes the output provided by a reducer 115 as a result to the soma core 102 in channel j. In addition, $\phi_j(\ )$ denotes the function performed by the synapse coprocessors 112 for the $j^{th}$ channel using the incoming data $x_i$ and possibly the parameters p, and $\Psi(\ )$ denotes the function performed by the reducer 115 for the local soma core 102 using the outputs of the synapse coprocessors 112.

Examples of the $\phi_j(\ )$ functions could include:

$r = x * a + b$ $r = x / \sqrt{a} + b$ $r = \max(x, c)$ $r = \min(x, c)$ $r = \text{select}(x, a, b)$ $r = \text{index}$ Here, a, b, c, and r could denote names of registers in a synapse coprocessor 112, and x could denote an input value from a soma core 102 (although another register of the synapse coprocessor 112 could also be used instead). The select operation tests the condition in the first parameter (such as by performing a simple non-zero test) and returns either the second parameter or the third parameter based on the result of the test. The index operation may be specific to an implementation with multiple soma groups. Each soma group could include the same number of soma cores 102. More details of soma groups are provided below. In some embodiments, none of the functions implemented by the synapse coprocessors 112 involves loops.

Examples of the $\Psi(\ )$ functions could include:

$$v=\text{sum}(r[i])$$

$$v=\text{max}(r[i])$$

$$v=\text{min}(r[i])$$

Here, v denotes the output of a reducer 115 provided to a soma core 102, and r[i] denotes the inputs received by the reducer 115 from the synapse coprocessors 112 (multiple values from the same synapse coprocessor 112 could be obtained in an implementation with multiple soma groups). Each of the max and min functions could return both (i) the maximum or minimum value and (ii) the index value i of the synapse coprocessor 112 that provided the maximum or minimum value. The result of the $\Psi(\ )$ function could be made available to the soma core 102 using one or more registers.

In these embodiments, the synapse coprocessors 112 might not be programmed with a traditional program that runs in a loop and that actively retrieves (and if necessary waits for) input. Instead, each channel can be associated with a program $\phi$, and the program $\phi$ can be marked as executable when data arrives for the channel and eventually executed when compute resources become available. When all synapse coprocessor programs $\phi$ finish, the result of the reduction program $\Psi$ can be computed. The computation of the result by the reduction program $\Psi$ could start as soon as a minimal number of the synapse coprocessor results are available, with caveats such as the one mentioned below. The results of the reduction program 'I' can be saved in per-channel registers. When a soma core 102 issues an instruction to read a reduction result, the reducer 115 may then be ready to produce the next reduction result for that channel. Until then, operation of the reducer 115 for that channel could be blocked.

The allocation of registers in the synapse coprocessors 112 and reducers 115 and the allocation of channels can be abstracted if desired. For example, instead of referring to an absolute index for each of these resources in a program specification, an allocation mechanism could be used to achieve the equivalent of multi-program execution. For example, when a program (including the $\phi$ and $\Psi$ programs) is loaded, the actual registers used can be chosen from available registers of a register file, and an available channel can be selected. No explicit concurrency has to be created since the program is invoked based on incoming data. Upon finishing the program, the used resources in terms of registers and channels can be made available again. The actual instructions executed by the synapse coprocessors 112 and reducers 115 do not have to know about any of this. Rather, the instructions of the uploaded program code could use absolute register numbers or indices, and the abstraction can occur at a higher level where the program loading by the soma core 102 is preceded by appropriate code generation or rewriting based on the needs of the program and the available resources.

One example caveat to the computation of a result by a reduction program $\Psi$ starting as soon as a minimal number of synapse coprocessor results are available is as follows. Depending on the operation and possibly the data type, the hardware architecture could support a mode that can significantly speed up execution of the program $\Psi$ at the expense of repeatability by not following a specified order of operations. For example, floating-point operations do not follow associativity rules because of the possibility of cancellation. A specific example of this is when floating-point additions must be performed in the same order to guarantee producing the exact same result each time. This could create slowdowns in cases where one input value is not yet available while other input values later in the order of operations are available. The reducer 115 could be programmed to either wait for the input values so that the operation order is always maintained (resulting in slowdowns), or the reducer 115 could be programmed to perform the sums out of order (allowing results to be obtained more quickly but with potentially less repeatability).

As noted above, an implementation of the hardware architecture can include more than one group of soma cores 102. Such an approach could implement the soma groups in a single integrated circuit, or different soma groups could be implemented as separate integrated circuits (and the integrated circuits can be coupled together, such as with electrical or optical connections). Several types of programs (including those discussed in more detail below) can be sped up significantly with this type of hardware architecture if an entire data set can be mapped to the soma cores 102.

To facilitate solutions with multiple soma groups, some resources and operations may be duplicated depending on the number of communication partners of each synapse coprocessor 112. For example, in a simple model, each synapse coprocessor 112 could receive results from exactly one soma core 102. In a solution with multiple soma groups, each synapse coprocessor 112 could receive results from one soma core 102 per soma group. In the synapse coprocessor programs, this can be expressed just like in an implementation with a single soma group if the resources related to data transfers (such as a register to hold transmitted data and a register to hold a result) are duplicated. A single processor can be therefore be implemented to work with up to S soma groups in case there are S duplicates for each synapse coprocessor register. To enable per-soma group parameters, it may be useful or necessary to provide access to the soma group number that is the source of the data. This could be achieved using the index operation described above, which returns the soma group number in addition to the soma core index used for a specific communication.

The implementation of multiple soma groups, if they are physically separated, could be achieved in any suitable manner, such as by coupling multiple integrated circuits using photonics or other high-speed interconnects. In cases where each soma core 102 writes its results to a dedicated bus, the respective buses of the different soma cores 102 in each soma group can be connected, which changes each bus from a 1:N communication bus to an S:N bus. This can be permitted, for instance, if transmitted data carries a full address, such as in the most general form [soma group ID, soma ID, channel ID], allowing the data to be routed on a per-soma group basis as long as it can be ensured that a synapse coprocessor 112 on each soma core 102 in each soma group receives the data.

In addition, there are a number of possible approaches for implementing the network(s) used to couple the soma cores 102 to the synapse coprocessors 112 using the signal lines 122 and 124. For example, as described above, each of N independent networks can have one of N soma cores 102 as a source and connects that soma core 102 to N synapse coprocessors 112 (one of each soma core 102). While a dedicated network for each output of each soma core 102 would minimize possible contention in data transfers, it means that resources go unused when no transmissions are occurring. Ideally, all of the soma cores 102 work in lockstep and transmit data at approximately the same time, which could be handled well only with dedicated signal lines. In reality, the soma cores 102 can lose sync due to various factors, such as minute effects in execution like waiting for resources or different dynamic decisions like branch predictions. In that case, the transmissions would not happen at exactly the same time. Since the transmitted data is usually small, the use of one (or a small number) of networks to connect the soma cores 102 might suffice without significant slowdowns, and it would provide improved utilization of resources. Note that in the address [soma group ID, soma ID, channel ID] described above, the soma ID can be dropped if each soma core 102 per soma group has its own dedicated network connecting it to a synapse coprocessor 112 on each soma core 102. Another implementation of the connection network could have one single network per soma group, and all data packages have complete addresses attached to them.

There are various ways to create networks between the soma cores 102. One possibility is to send all data packets from a central starting point to each recipient. From this starting point, data packets can also easily be sent to other soma groups. Advantages of this approach include direct delivery, high throughput (no conflicts with transmissions to different targets), and low latency. One drawback is high cost, especially with one network per soma or per group of somas.

Another approach would be to provide point-to-point connections with a limited set of soma cores 102 and have recipients distribute data packages further. The recipients can be connected to different subsets of the soma cores 102, and these subsets can be selected to ensure that all soma cores 102 are connected. Ideally, the subsets can be selected to reduce or minimize the "diameter" of the network, where the diameter of a network refers to the maximal distance (the number of soma cores 102 to step through to reach a target) between two cores 102. Given a fixed upper limit on the number of connections per soma core 102, a hypercube architecture of that degree could minimize the diameter.

To ensure that all soma cores 102 receive data and spread transmissions over as many individual connections as possible, various approaches could be used. For example, well-known algorithms can take the index of a sender soma core 102 and the link that data was received from into account. In those cases, data from each soma core 102 can be sent in a fixed pattern, but the pattern can be different for individual soma cores 102, maximizing the utilization of connections. This approach also allows elimination of a central starting location for each network since each soma core 102 could just communicate with selected neighbors and the neighbors could forward data if necessary. One or more soma cores 102 in a network could be responsible for sending data to other soma groups, and different soma cores 102 may be responsible for communications with different soma groups.

Dynamic algorithms can also be used. For example, every received packet can be forwarded from one soma core 102 to all neighbors (except the soma core 102 sending the packet). Each neighbor soma core 102 could then keep track of whether it has already seen the packet. If so, the packet can simply be discarded. If not, the synapse coprocessor 112 for the neighbor soma core 102 receives and forwards the packet. One advantage of this approach is that the network can be completely flooded more quickly. Another advantage of this approach is that integrating multiple soma groups into the design is more straightforward. Changing a 1:N bus architecture (which never has to check for sender conflicts) to an S:N architecture can be a big step. If a soma core 102 of one soma group forwards a packet to another soma core 102 in another soma group, the latter can regard the packet similar to how it would regard any other incoming packet. In fact, the inter-soma core link can be regarded like normal inter-soma intra-soma group connections.

As noted above, a number of new instructions can be used to facilitate the use of the synapse coprocessors 112 and the reducers 115. These instructions include instructions executed by the soma cores 102, as well as instructions provided to and executed by the synapse coprocessors 112 and the reducers 115. The following presents examples of the types of new instructions that can be used to support the new hardware architectures. Note that while specific instructions are described below, other or additional instructions could be supported in a hardware architecture as needed or desired.

Table 1 illustrates example instructions that could be executed by a soma core 102 and the synapse coprocessors. In Table 1, oreg denotes a soma core register (such as in the memory device 106), and yreg denotes a synapse coprocessor register (such as in the memory device 114).

TABLE 1

| Instruction | Description |
| --- | --- |
| send oreg → channel | Broadcast a soma core's value from the oreg register to synapse coprocessors of other soma cores using a specific channel (this could be done in parallel with broadcasts on other channels). |
| recv channel → oreg1 [, oreg2] | Receive from the local reducer the results of the last computation in channel. The results are stored in the provided registers. Two results are returned for certain reduction operations which then require two result registers. |
| store oreg → channel | Broadcast a soma core's value from the oreg register to all synapse coprocessors of this soma core using a specific channel. |
| synapse channel {recv → yreg . . . } [reduce . . . ] | Receive a value from a specified channel and store it in the synapse coprocessor's yreg register. The source of the data can be a 'send' or 'store' instruction. This event may then trigger further synapse coprocessor instructions. Upon completion, a reduction step optionally happens with the different operations as shown in Table 2. |
| id → oreg | Provide a soma core identifier into the oreg register |

Table 2 illustrates example operations that could be executed by a reducer 115. Reduction operations could take many cycles logarithmically, so the reduction operations could benefit from pipelining multiple such operations in different tree levels.

TABLE 2

| Instruction | Description |
| --- | --- |
| reduce add → oreg | Sum all synapse coprocessors' outputs and store the sum in the oreg register. |
| reduce min → oreg1, oreg2 | Identify the minimum value of all synapse coprocessors' outputs from their first result and store the minimum value in the oreg1 register. The second result the synapse coprocessor providing the minimum value is stored in the oreg2 register. |
| reduce max → oreg1, oreg2 | Identify the maximum value of all synapse coprocessors' outputs from their first result and store the maximum value in the oreg1 register. The second result of the synapse coprocessor providing the maximum value is stored in the oreg2 register. |
| reduce one yreg → oreg | Store the value of a specific synapse coprocessor's yreg result for a specific channel in the oreg register. |

In some embodiments, each synapse coprocessor 112 can perform SIMD operations. Each soma core 102 can upload, ahead of data communications on a specific channel, sequences of instructions for that channel to a local synapse coprocessor 112. Additionally, each soma core 102 can upload sequences of instructions for that channel to all its synapse coprocessors 112 by broadcasting. The soma core 102 can further program into the reducer 115 the operation that should be performed once the necessary input data becomes available. Table 3 illustrates examples of the types of instructions that could be uploaded to the synapse coprocessors 112 for execution.

TABLE 3

| Instruction | Description |
| --- | --- |
| id → yreg | Provide a synapse identifier into a synapse coprocessor's yreg register. In case of an implementation with multiple soma groups, the output includes a differentiation of the soma group, as well. |
| add yreg1 yreg2 → yreg3 | Compute a sum of two synapse coprocessor registers yreg1 and yreg2 and store a result in yreg3 |
| subtract yreg1 yreg2 → yreg3 | Compute a difference of two synapse coprocessor registers yreg1 and yreg2 and store a result in yreg3 |
| multiply yreg1 yreg2 → yreg3 | Compute a product of two synapse coprocessor registers yreg1 and yreg2 and store a result in yreg3 |
| min yreg1 yreg2 → yreg3 | Compute a minimum of two synapse coprocessor registers yreg1 and yreg2 and store a result in yreg3 |
| max yreg1 yreg2 → yreg3 | Compute a maximum of two synapse coprocessor registers yreg1 and yreg2 and store a result in yreg3 |
| invsqrt yreg1 → yreg2 | Compute a reciprocal square root of a synapse coprocessor register yreg1 and store a result in yreg2 |
| if yreg1 then yreg2 else yreg3 → yreg4 | Select one of two synapse coprocessor registers yreg2 and yreg3 based on yreg1 and store the selected value in yreg4 |
| return yreg1 [, yreg2] | Pass value(s) yreg1 (and in some cases yreg2) and signal completion to a reducer |

The hardware architectures described above can accelerate a broad class of algorithms in machine learning, scientific computing, video games, and other areas. Based on the types of instructions above, the following describes how six example types of problems can be accelerated and solved using the hardware architectures described in this patent document.

As a first example, one algorithm used in deep learning that can be accelerated by the proposed architectures is sparse coding. In its simplest form, sparse coding takes a normalized input vector x with $\|x\|=1$ and computes a normalized sparse output vector y that minimizes energy e, which is defined as:

$$e = \frac{1}{2}\|y - Fx\|^2 + \lambda\|y\|_{\ell^1} \quad (2)$$

Here, F is a factor matrix, and $\|y\|=1$. Also, $\|y\|_{\ell^1}$ denotes a sum of the absolute values of the entries in y, and $\lambda$ is a constant that controls sparseness of the output. In unsupervised learning mode, the factor matrix F is chosen to minimize the sum E of the energies $e_i$ across a set of training inputs $x_i$. One way to accomplish both minimizations is gradient descent, with the negative gradients defined as:

$$-\nabla_{y_i} E = -(y_i - Fx_i) + \lambda \operatorname{sgn} y C_i \quad (3)$$

$$-\nabla_F E = \Sigma_i (y_i - Fx_i) \otimes x_i \quad (4)$$

followed by imposition of the constraints $\|y_i\|=1$. Here, sgn y denotes a vector of signs of the entries in y.

To compute (y−Fx), the training inputs x and the outputs y can reside in a shared virtual or local soma memory. The entries of the factor matrix F (which is not sparse) can reside in registers of the synapse coprocessors 112. Specifically, the entry $F^{jk}$ of the factor matrix F can reside in a register of the $k^{th}$ synapse coprocessor 112 for the $j^{th}$ soma core 102. The SIMD instructions broadcast by the soma cores 102 to their synapse coprocessors 112 can use relative addressing so that, simultaneously across soma cores 102, the $k^{th}$ soma core 102 can broadcast the input entry $x^k$ to the $k^{th}$ synapse coprocessor 112 of the $j^{th}$ soma core 102. The $k^{th}$ synapse coprocessor of the $j^{th}$ soma core 102 in SIMD fashion performs the multiplication $F^{jk}x^k$, which is then summed in logarithmic time by the reducer 115 of the $j^{th}$ soma core 102 across that soma core's synapse coprocessors 112 to yield $(Fx)^j$ and thus the $j^{th}$ entry $(y-Fx)^j$.

To compute the gradient descent for F, the entry $F_{jk}$ is incremented proportionally to $(y-Fx)^j x_k$. The $j^{th}$ soma core 102 has just computed $(y-Fx)^j$, and its $k^{th}$ synapse coprocessor 112 has received the most recent $x^k$ value and stored it in a register of the synapse coprocessor 112. Thus, the $j^{th}$ soma core 102 broadcasts $(y-Fx)^j$ to its $k^{th}$ synapse coprocessor 112, which then in SIMD fashion multiplies the result by the stored $x^k$ value and adds a multiple of that value to the $F^{jk}$ value stored at that synapse coprocessor 112.

To express this in pseudocode, since the soma cores 102 are multiple instruction, multiple data (MIMD) cores, a convention is adopted where i represents the index of the soma core 102 on which the instruction is being placed. Due to MIMD, the instructions may be parameterized by i. In contrast, since the synapse coprocessors 112 could be SIMD cores, the soma cores 102 can broadcast the same instruction sequence to all of its synapse coprocessors 112. For clarity, registers are labeled with variable names instead of register numbers. Given these conventions, the sparse coding for deep learning problem can be solved using the hardware architecture as follows.

```
send x → cid1
synapse cid1 {
    recv → x
    multiply F x → y'
    return y'
} reduce add recv cid1 → y'
y - y' → dy
store dy → cid2
synapse cid2 {
    recv → dy
    multiply dy x → dF
    multiply dF -e → dF
    add F dF → F
}
```

As a second example, another algorithm used in deep learning that can be accelerated by the proposed architectures involves restricted Boltzmann machines. In this type of network, a $\{-1,1\}$-valued input vector x and an output vector y can be probabilistically related by a Boltzmann distribution as follows:

$$P(x, y) = \frac{e^{-E(x,y)}}{Z} \quad (5)$$

Here, Z is a partition function, and energy $E(x,y)$ in its simplest form can be expressed as:

$$E(x,y) = -\Sigma_{j,k} y^j F^{jk} x^k \quad (6)$$

This network is "restricted" in the sense that the outputs are conditionally independent given the inputs and vice versa. This means that, given the inputs, the outputs can be sampled independently with a probability expressed as:

$$P(y^j=1|x) = \sigma(\Sigma_k F^{jk} x_k) \quad (7)$$

where $\sigma(x)$ is a logistic function. The contrastive divergence unsupervised training algorithm for this network takes a gradient for a coupling F to be:

$$\nabla F = y' \otimes x' - y \otimes x \quad (8)$$

where x is a training input, y is sampled from x as explained above, x' is sampled from y, and y' is sampled from x'.

To implement this problem, the training inputs $x^k$ and the outputs $y^j$ can reside in a shared virtual or local soma memory. The couplings $F^{jk}$ can reside in registers of the synapse coprocessors 112. Specifically, each coupling $F^{jk}$ can reside in a register of the $k^{th}$ synapse coprocessor 112 of the $j^{th}$ soma core 102. To explain how this algorithm is accelerated, the sampling step is first explained. Given an input vector x, via SIMD communication simultaneously across soma cores 102, the $k^{th}$ soma core 102 broadcasts the input entry $x^k$ to the $k^{th}$ synapse coprocessor 112 of the $j^{th}$ soma core 102. The $k^{th}$ synapse coprocessor 112 of the $j^{th}$ soma core 102 then in SIMD fashion performs the multiplication $F^{jk}x^k$, which is then summed in logarithmic time by the reducer 115 of the $j^{th}$ soma core 102 across that soma core's synapse coprocessors 112 to yield $\Sigma_k F^{jk}x^k$. The $j^{th}$ soma core 102 then computes the logistic function of this sum and uses it as a probability to randomly sample) $y^j$ from $\{-1,1\}$.

Next, the computation of the gradient occurs. Starting with the training input x, perform the sampling step as described above three times to yield y in the $j^{th}$ soma core 102, x' in the $k^{th}$ soma core 102, and y' in the $j^{th}$ soma core 102. The $j^{th}$ soma core 102 broadcasts $y^j$ and $(y')^j$ to all its synapse coprocessors 112 to be stored in registers there. Then, high-bandwidth communication is used to simultaneously transmit $(x')^k$ from the $k^{th}$ soma core 102 to the $k^{th}$ synapse coprocessor 112 of every soma core 102. Finally, the $k^{th}$ synapse coprocessor 112 of the $j^{th}$ soma core 102 calculates $(y')^j(x')^k - y^j x^k$ and subtracts a multiple of this from the value $F^{jk}$ that it holds.

In pseudocode, the forward sampling algorithm can be expressed as:

```
send x → cid
synapse cid {
    recv → x
    multiply F x → y'
    return y'
} reduce add
recv cid → y'
σ(y') → p
if(rand( ) < p) then y = 1 else y = -1 endif
```

The backward sampling can be analogous. Given the sampling, the gradient algorithm can be expressed as:

```
forward sample x → y (keep x in synapse register)
backward sample y → x' (keep y in synapse register)
forward sample x' → y' (keep x' in synapse register)
store y' → cid2
synapse cid2 {
    recv → y'
    multiply y' x' → yx'
    multiply y x -1 → yx
    add yx' yx → dF
    multiply dF -e → dF
    add F dF → F
}
```

As a third example, a different machine learning method that can benefit from better communication is hierarchical clustering. The simplest hierarchical clustering method starts with each item in its own cluster. Then, at each hierarchy level, the hierarchical clustering method groups the two clusters separated by the smallest minimum distance into a single cluster.

The first step of an improved hierarchical clustering method involves calculating an initial matrix of distances between clusters. Each active soma core 102 can represent a cluster, and its synapses coprocessors 112 can store the squared distances to other clusters. In a first iteration, each cluster is a single item, so each active soma core 102 broadcasts its item's coordinates to the corresponding synapse coprocessors 112 of the other soma cores 102, and its synapse coprocessors 112 in parallel compute the squared distances of the other items to its own item. The second step of the improved hierarchical clustering method involves finding the minimum squared distance between clusters. Each soma core 102 (through its reducer 115) reduces its own synapse coprocessors' squared distances using the minimum operation, and each soma core 102 broadcasts this number to all soma cores 102, which again reduce the values (through their reducers 115) with a minimum operation. The second minimum operation produces on all soma cores 102 the same result, assuming there is a predictable tie breaker in cases of equal values (such as select the lowest index synapse core's value). An alternative is to perform the second minimum operation on one soma core 102 and broadcast back the result to all other some cores 102.

The third step of the improved hierarchical clustering method involves finding the two clusters that are separated by this minimum distance. The soma core 102 corresponding to the best cluster computes the minimum distance to a soma core 102 other than itself, and this next best cluster is then broadcast back to all soma cores 102. The fourth step of the improved hierarchical clustering method involves combining the two chosen clusters into a single cluster. Each soma core 102 takes the minimum of its distances to the best and next best clusters, stores the minimum distance back in the synapse coprocessor 112 corresponding to the best cluster, and broadcasts the minimum distance on this soma core's channel. The soma core 102 corresponding to the best cluster then has all of its synapse coprocessors 112 replace their distances with these broadcast ones. Finally, the next best soma core 102 and its corresponding synapse coprocessors 112 drop out of the computation. The second through fourth steps are then repeated until there is only a single cluster.

In pseudocode, the first step of calculating the squared distance matrix (repeating for each coordinate) can be expressed as:

```
send -x → cid
synapse cid {
    recv → x'
    add x x' → dx        // x is the local cluster's coordinate
    multiply dx dx → dx
    add dist dx → dist
    return dist
} reduce min
recv cid → mindist
```

The second step of finding the minimum distance between clusters can be expressed as:

```
send mindist → cid2
synapse cid2 {
    recv → mindist ; id → cluster
    return mindist, cluster
} reduce min
recv cid2 → allmindst, mincluster
```

The third step of finding the two clusters separated by the minimum distance can be expressed as:

```
if(mincluster == id) then
    store -mincluster → cid3
    synapse cid3 {
        recv → mincluster
        id → cluster
        add cluster mincluster → notmin
        if notmin then dist else ∞ → mindist
        return mindist, cluster
    } reduce min
    recv cid3 → dummy, nextcluster
    send nextcluster → cid4
else
    send 0 → cid4
endif
synapse id {
    recv → nextcluster
} reduce one mincluster
recv cid5 → nextcluster
store -mincluster → cid6
synapse cid6 {
    recv → mincluster
    id → cluster
    add cluster mincluster → notmin
    return dist
} reduce one mincluster
recv cid6 → mindist
store -nextcluster → cid7
synapse cid7 {
    recv → nextcluster
    add cluster nextcluster → notnext
    return dist
} reduce one nextcluster
recv cid7 → nextdist
mindist = min(mindist, nextdist)
```

The fourth step of combining the two closest clusters (and deactivating one of them) can be expressed as:

```
store mindist → cid8
synapse cid8 {
    recv → mindist
    if notmin then dist else mindist → dist
    if notnext then dist else ∞ → dist
}
send mindist → cid9
if(mincluster == id) then
    synapse cid9 { recv → dist }
elif(nextcluster == id) then
    synapse cid9 {recv → dummy; ∞ → dist }
else
    synapse cid9 {recv → dummy }
endif
```

As a fourth example, another popular machine learning method involves Bayesian networks, which decompose a complicated joint probability function of many variables into a product of conditional probabilities, each of which involves only a small number of variables (up to the in-degree of the network). The problem then is to compute the marginal distribution of each variable. In a standard serial architecture, this can be accomplished using the Belief Propagation Algorithm, which takes time proportional to:

$$\text{Variables} \times \text{In-Degree} \times 2^{\text{In-Degree}} \tag{9}$$

This algorithm iteratively computes the above number of products and then computes Variables×In Degree sums of $2^{In\text{-}Degree}$ such products each.

Using the new hardware architectures, this can be accomplished in constant time as long as there are adequate soma cores 102 and synapse coprocessors 112. The fan-in to any one soma core 102 is only $2^{In\text{-}Degree}$, so this does not saturate communications. To compute products, one can either accumulate sums of logs (where the exp and log operations are performed in the soma cores 102) or expand the available accumulation methods of the reducer 115 to include products as well as sums.

As a fifth example, other applications unrelated to artificial intelligence that could be accelerated with the architectures include molecular simulation and virtual reality. For these applications, assume that the synapse coprocessors 112 have hardware for a reciprocal square root operation $(1/\sqrt{x})$ in addition to multiplication and addition. The expensive step in both applications is similar. Focusing on molecular simulation, it is the computation of the Coulomb potential:

$$U_j = \sum_{k \neq j} \frac{q_j q_k}{r_{jk}} \quad (10)$$

where $q_j$ is the $j^{th}$ charge and $r_{jk}$ is the distance between the $j^{th}$ and $k^{th}$ charges. High-bandwidth communication takes care of simultaneously broadcasting the coordinates of the $k^{th}$ charge from the $k^{th}$ soma core 102 to the $k^{th}$ synapse coprocessor of the $j^{th}$ soma core 102 across all j and k. In each synapse coprocessor 112, addition and multiplication are used to compute $r_{jk}^2$ and then the reciprocal square root is used to compute $1/r_{jk}$. Finally, the sum is computed by the $j^{th}$ soma core 102 using an accumulator (the reducer 115) across its synapse coprocessors 112.

As a sixth example, another class of algorithms that can be accelerated from quadratic to constant time by the proposed architectures involves geometric algorithms, such as convex hull algorithms. These algorithms may not require the nonlinear capabilities of the proposed architectures and may only rely on the matrix processing capabilities of the proposed architectures. It shown been shown that one key step of these algorithms in high dimensions is dynamic determinant computation. This computation can be accomplished serially in quadratic time by matrix-vector multiplications. However, these multiplications can be reduced to constant time using the proposed architectures.

Note that these examples are provided above merely to demonstrate how particular solutions to particular problems could be solved using the hardware architectures described in this patent document. Of course, the hardware architectures could be used to perform other functions. Moreover, the particular problems described above could be solved using other solutions implemented using the hardware architectures.

The hardware architectures and associated instructions/operations described in this patent document can provide various advantages over prior approaches, depending on the implementation. For example, this disclosure provides hardware architectures that (if implemented with an adequate number of components) allow the architectures to rival the abilities of the human brain. Moreover, the functionalities of the hardware architectures can be used to improve other fields of computing, such as artificial intelligence, deep learning, molecular simulation, and virtual reality.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
multiple parallel computing cores, each computing core configured to perform one or more processing operations and generate input data; and
multiple sets of parallel coprocessors, each computing core associated with a different one of the sets of parallel coprocessors, the coprocessors in each set of parallel coprocessors configured to process at least some of the input data from at least some of the computing cores and generate output data;
wherein each of the computing cores is further configured to receive and process one or more results of at least one function applied to the output data generated by the associated set of parallel coprocessors in order to generate additional input data.

2. The apparatus of claim 1, wherein:
a number of computing cores matches a number of coprocessors in each set of parallel coprocessors; and
each computing core is configured to provide its input data to one of the coprocessors in each set of parallel coprocessors.

3. The apparatus of claim 1, wherein each of the computing cores is configured to communicate directly with all of the computing cores including itself via the sets of parallel coprocessors.

4. An apparatus comprising:
multiple parallel computing cores, each computing core configured to perform one or more processing operations and generate input data;
multiple sets of parallel coprocessors, each computing core associated with a different one of the sets of parallel coprocessors, the coprocessors in each set of parallel coprocessors configured to process at least some of the input data from at least some of the computing cores and generate output data; and
multiple reducer circuits, each computing core associated with a different one of the reducer circuits;
wherein each reducer circuit is configured to receive the output data from the coprocessors in a different one of the sets of parallel coprocessors, to apply one or more functions to the output data, and to provide one or more results to the associated computing core; and
wherein each of the computing cores is further configured to generate additional input data based on the one or more results generated by the associated reducer circuit.

5. The apparatus of claim 1, wherein all of the computing cores are configured to broadcast the input data to the sets of parallel coprocessors simultaneously.

6. The apparatus of claim 1, wherein the computing cores in each of multiple subsets of computing cores are configured to broadcast the input data to at least some of the sets of parallel coprocessors simultaneously.

7. The apparatus of claim 1, wherein at least some of the computing cores are configured to transmit the input data to at least some of the sets of parallel coprocessors serially.

8. The apparatus of claim 1, wherein:
the multiple parallel computing cores comprise N parallel computing cores;
each set of parallel coprocessors comprises N parallel coprocessors respectively associated with the N parallel computing cores; and
N is an integer greater than or equal to sixteen.

9. A system comprising:
multiple integrated circuit devices, each integrated circuit device comprising:
multiple parallel computing cores, each computing core configured to perform one or more processing operations and generate input data; and
multiple sets of parallel coprocessors, each computing core associated with a different one of the sets of parallel coprocessors, the coprocessors in each set of parallel coprocessors configured to process at least some of the input data from at least some of the computing cores and generate output data;
wherein each of the computing cores is further configured to receive and process one or more results of at least one function applied to the output data generated by the associated set of parallel coprocessors in order to generate additional input data; and
at least one connection coupling the integrated circuit devices.

10. The system of claim 9, wherein, in each integrated circuit device:
a number of computing cores matches a number of coprocessors in each set of parallel coprocessors; and
each computing core is configured to provide its input data to one of the coprocessors in each set of parallel coprocessors.

11. The system of claim 9, wherein, in each integrated circuit device, each of the computing cores is configured to communicate directly with all of the computing cores including itself via the sets of parallel coprocessors.

12. A system comprising:
multiple integrated circuit devices, each integrated circuit device comprising:
multiple parallel computing cores, each computing core configured to perform one or more processing operations and generate input data;
multiple sets of parallel coprocessors, each computing core associated with a different one of the sets of parallel coprocessors, the coprocessors in each set of parallel coprocessors configured to process at least some of the input data from at least some of the computing cores and generate output data; and
multiple reducer circuits, each computing core associated with a different one of the reducer circuits;
wherein each reducer circuit is configured to receive the output data from the coprocessors in a different one of the sets of parallel coprocessors, to apply one or more functions to the output data, and to provide one or more results to the associated computing core; and
wherein each of the computing cores is further configured to generate additional input data based on the one or more results generated by the associated reducer circuit; and
at least one connection coupling the integrated circuit devices.

13. The system of claim 9, wherein, in each integrated circuit device, all of the computing cores are configured to broadcast the input data to the sets of parallel coprocessors simultaneously.

14. The system of claim 9, wherein, in each integrated circuit device, the computing cores in each of multiple subsets of computing cores are configured to broadcast the input data to at least some of the sets of parallel coprocessors simultaneously.

15. The system of claim 9, wherein, in each integrated circuit device, at least some of the computing cores are configured to transmit the input data to at least some of the sets of parallel coprocessors serially.

16. The system of claim 9, wherein, in each integrated circuit device:
- the multiple parallel computing cores comprise N parallel computing cores;
- each set of parallel coprocessors comprises N parallel coprocessors respectively associated with the N parallel computing cores; and
- N is an integer greater than or equal to sixteen.

17. A method comprising:
- generating input data using multiple parallel computing cores, each computing core configured to perform one or more processing operations;
- providing the input data from the computing cores to multiple sets of parallel coprocessors, each computing core associated with a different one of the sets of parallel coprocessors;
- processing the input data using the sets of parallel coprocessors to generate output data;
- receiving, at each of the parallel computing cores, one or more results of at least one function applied to the output data generated by the associated set of parallel coprocessors; and
- generating, using each of the parallel computing cores, additional input data based on the one or more results of the at least one function applied to the output data generated by the associated set of parallel coprocessors.

18. The method of claim 17, wherein all of the computing cores are configured to broadcast the input data to the sets of parallel coprocessors simultaneously.

19. The method of claim 17, wherein the computing cores in each of multiple subsets of computing cores are configured to broadcast the input data to at least some of the sets of parallel coprocessors simultaneously.

20. The method of claim 17, wherein at least some of the computing cores are configured to transmit the input data to at least some of the sets of parallel coprocessors serially.

* * * * *

UNITED STATES PATENT AND TRADEMARK OFFICE
CERTIFICATE OF CORRECTION

Page 1 of 1

PATENT NO. : 10,810,156 B2
APPLICATION NO. : 16/138590
DATED : October 20, 2020
INVENTOR(S) : Paul Burchard et al.

It is certified that error appears in the above-identified patent and that said Letters Patent is hereby corrected as shown below:

On the Title Page

(71) Applicant should read: Goldman Sachs & Co. LLC, New York, NY (US)

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*